(12) United States Patent
Komagata

(10) Patent No.: US 8,385,209 B2
(45) Date of Patent: Feb. 26, 2013

(54) NETWORK COMMUNICATION APPARATUS

(75) Inventor: Junichi Komagata, Tokyo (JP)

(73) Assignee: Sony Corporation, Tokyo (JP)

( * ) Notice: Subject to any disclaimer, the term of this patent is extended or adjusted under 35 U.S.C. 154(b) by 304 days.

(21) Appl. No.: 12/724,189

(22) Filed: Mar. 15, 2010

(65) Prior Publication Data

US 2010/0246402 A1 Sep. 30, 2010

(30) Foreign Application Priority Data

Mar. 24, 2009 (JP) ................. P2009-071890

(51) Int. Cl.
H04L 12/06 (2006.01)
(52) U.S. Cl. ..................................... 370/236
(58) Field of Classification Search .................. 370/236
See application file for complete search history.

(56) References Cited

U.S. PATENT DOCUMENTS

| 6,804,201 | B1* | 10/2004 | Gelenbe | 370/255 |
| 7,236,459 | B1* | 6/2007 | Okholm et al. | 370/231 |
| 7,565,439 | B2* | 7/2009 | Mizuno et al. | 709/230 |
| 2006/0176862 | A1* | 8/2006 | Ishimori et al. | 370/338 |
| 2008/0144660 | A1* | 6/2008 | Godlewski | 370/468 |
| 2009/0083570 | A1* | 3/2009 | Shiraishi et al. | 713/600 |
| 2010/0077142 | A1* | 3/2010 | Fienblit et al. | 711/118 |

OTHER PUBLICATIONS

Mastering TCP/IP Beginning Guide, Ver. 4, p. 217.

* cited by examiner

Primary Examiner — Ricky Ngo
Assistant Examiner — Ben H Liu
(74) Attorney, Agent, or Firm — Finnegan, Henderson, Farabow, Garrett & Dunner, L.L.P.

(57) ABSTRACT

A network communication apparatus transmitting a first acknowledgment from a higher-level layer to a transmission source of a predetermined number of first segments and a second segment from the higher-level layer to a transmission source of a second acknowledgment, includes: a first condition setting section in which a first condition for specifying a connection to delay the first acknowledgment is set; a first judgment section to judge whether the first acknowledgment is to be delayed; a transmission processing section to delay the to-be-delayed first acknowledgment and transmit it to the transmission source of the first segments; a second condition setting section in which a second condition for specifying a connection to delay the second acknowledgment is set; a second judgment section to judge whether the second acknowledgment is to be delayed; and a reception processing section to delay the to-be-delayed second acknowledgment and transfer it to the higher-level layer.

7 Claims, 17 Drawing Sheets

711 Transmission table

| Entry | Effective flag | Transmission destination IP address | Transmission source IP address | Transmission destination port number | Transmission source port number | Last hit time |
|---|---|---|---|---|---|---|
| Entry #1 | ON | xxx.xxx.xxx.xxx | yyy.yyy.yyy.yyy | 21 | 21 | *** |
| Entry #2 | ON | zzz.zzz.zzz.zzz | yyy.yyy.yyy.yyy | 14830 | 30045 | *** |
| ... | ... | ... | ... | ... | ... | ... |
| Entry #N | OFF | AAA.AAA.AAA.AAA | yyy.yyy.yyy.yyy | 45633 | 15999 | *** |

FIG.5

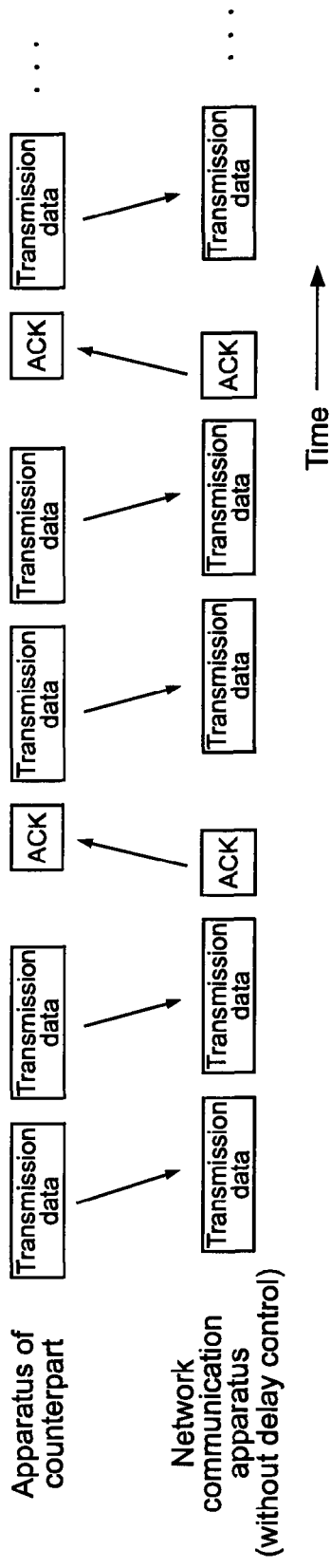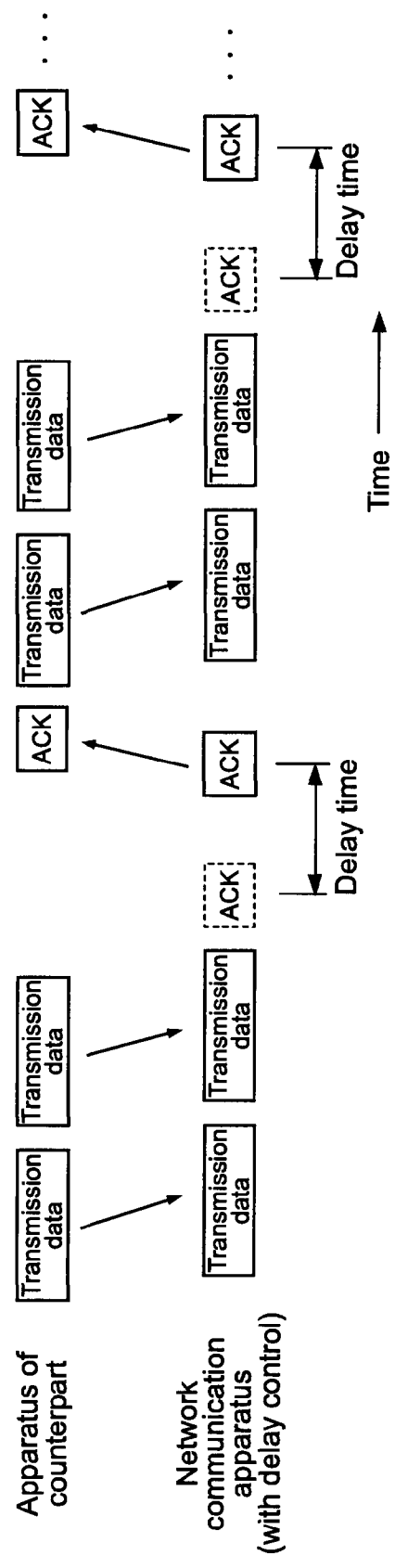

NETWORK COMMUNICATION APPARATUS

BACKGROUND OF THE INVENTION

1. Field of the Invention

The present invention relates to a network communication apparatus used in TCP/IP communication.

2. Description of the Related Art

In TCP/IP (Transmission Control Protocol/Internet Protocol) communication, flow control is carried out for preventing a buffer overflow in which a reception-side node cannot process all pieces of data from a transmission-side node and a buffer becomes full. For example, in best-effort burst communication such as FTP (File Transfer Protocol) communication, an inter-node transmission rate is largely affected by a transmission channel status or a CPU load status of an apparatus. For this reason, a buffer overflow occurs relatively easily, and flow control is thus essential. On the other hand, in streaming, by controlling a band used so as to guarantee a transmission rate necessary for reproduction, a buffer overflow is suppressed as compared to the best-effort communication.

Next, flow control of the related art will be described. In a MAC (Media Access Control) layer corresponding to a lower-level sublayer of a data link layer in an OSI reference model of a network, a flow control mechanism defined by IEEE802.3x is prepared. In this flow control mechanism, a stop packet is transmitted to a transmission source to thus stop a data transmission when a remaining capacity of a reception buffer becomes small, and a stop release packet is transmitted to thus resume the data transmission upon increase in the remaining capacity of the reception buffer. Accordingly, the buffer overflow is suppressed, and a high-throughput data transmission becomes possible.

Moreover, in TCP, when transmission data (predetermined number of segments) reaches a reception-side apparatus, the reception-side apparatus transmits an acknowledgment (ACK) to notify a transmission source that the data has reached the reception-side apparatus. The same effect can also be expected by delaying this acknowledgment (see, for example, "*Mastering TCP/IP, Introduction, Fourth Edition*" by Takafumi Takeshita, Yukio Murayama, Toru Arai, Yukio Karita (Feb. 25, 2007) p. 217).

SUMMARY OF THE INVENTION

However, in the flow control system in which a data transmission by a transmission-side node is stopped by transmitting a stop packet or a system that merely delays an acknowledgment (ACK), data transmissions of all established connections are stopped or delayed. For example, in a case where best-effort burst communication of an FTP or the like is started when a streaming including a moving image is being reproduced while received in real time, data transmissions of both connections are stopped or delayed. As a result, there has been a fear that reproduction of a moving-image streaming becomes fragmentary, and a moving image cannot be reproduced favorably.

In view of the circumstances as described above, there is a need for a network communication apparatus capable of delaying an acknowledgment of some specific connections out of a plurality of established connections to thus improve a communication quality of other specific connections.

According to an embodiment of the present invention, there is provided a network communication apparatus transmitting, via a network, a first acknowledgment transferred from a higher-level layer with respect to a reception of a predetermined number of first segments to a transmission source of the first segments and transmitting, via the network, a second segment transferred from the higher-level layer with respect to a reception of a second acknowledgment to a transmission source of the second acknowledgment, the network communication apparatus including: a first condition setting section in which a first condition for specifying a connection to delay the first acknowledgment is set; a first judgment means for judging whether the first acknowledgment transferred from the higher-level layer is to be delayed in accordance with the first condition set in the first condition setting section; a transmission processing means for delaying the first acknowledgment judged to be delayed and transmitting it to the transmission source of the first segments; a second condition setting section in which a second condition for specifying a connection to delay the second acknowledgment is set; a second judgment means for judging whether the second acknowledgment received via the network is to be delayed in accordance with the second condition set in the second condition setting section; and a reception processing means for delaying the second acknowledgment judged to be delayed and transferring it to the higher-level layer.

When the network communication apparatus according to the embodiment of the present invention operates as a side that receives the first segments and transmits the first acknowledgment, a first acknowledgment of a connection that satisfies the first condition out of the transmitted first acknowledgments is delayed. Accordingly, a band that can be allocated to communication of other specific connections increases, with the result that a communication quality can be improved. Moreover, also when the network communication apparatus operates as a side that transmits the second segment and receives the second acknowledgment, a transfer of a second acknowledgment of a connection that satisfies the second condition out of the received second acknowledgments to the higher-level layer is delayed. Accordingly, a band that can be allocated to communication of other specific connections increases, with the result that a communication quality can be improved.

In the embodiment of the present invention, the first condition and the second condition are a port number and an IP address of a communication counterpart, the first judgment means judges that the first acknowledgment is to be delayed when a port number and an IP address of a communication counterpart included in a header of the first acknowledgment transferred from the higher-level layer respectively match a port number and an IP address of a communication counterpart that are set as the first condition, and the second judgment means judges that the second acknowledgment is to be delayed when a port number and an IP address of a communication counterpart included in a header of the second acknowledgment received via the network respectively match a port number and an IP address of a communication counterpart that are set as the second condition.

With this structure, an acknowledgment can be delayed with respect to communication with a specific communication counterpart that uses a specific application protocol. As a result, a quality of communication with other specific communication counterparts that uses other specific application protocols can be improved.

In the embodiment of the present invention, the first condition further includes an upper limit of a first transmission rate of the first acknowledgment, the first judgment means judges that the first acknowledgment is to be delayed when the port number and the IP address of a communication counterpart included in the header of the first acknowledgment transferred from the higher-level layer respectively match the port number and the IP address of a communication counterpart that are set as the first condition and a measurement value of a transmission rate of the first acknowledgment is equal to or larger than the upper limit of the first transmission rate included in the first condition, the second condition further includes an upper limit of a second transmission rate of the second acknowledgment, and the second judgment means judges that the second acknowledgment is to be delayed when the port number and the IP address of a communication counterpart included in the header of the second acknowledgment received via the network respectively match the port number and the IP address of a communication counterpart that are set as the second condition and a measurement value of a transmission rate of the second acknowledgment is equal to or larger than the upper limit of the second transmission rate included in the second condition.

According to the embodiment of the present invention, an acknowledgment can be delayed with respect to communication with a specific communication counterpart that uses a specific application protocol and communication in which a transmission rate of the acknowledgment is an upper limit or more. With this structure, a connection in which an acknowledgment needs to be delayed can be judged with higher reliability. This embodiment is particularly effective in a case where a band used for the communication cannot be specified with only a limitation of the application protocol and a communication counterpart.

In the embodiment of the present invention, the transmission processing means includes a first table registration means for extracting first connection information that specifies a connection from the header of the first acknowledgment judged to be delayed by the first judgment means and registering it in a first table, a first delay means for comparing second connection information included in the header of the first acknowledgment transferred from the higher-level layer with the first connection information in the first table and delaying the first acknowledgment when the second connection information and the first connection information match, a second table registration means for extracting third connection information that specifies a connection from the header of the second acknowledgment judged to be delayed by the second judgment means and registering it in a second table, and a second delay means for comparing fourth connection information included in the header of the second acknowledgment received via the network with the third connection information in the second table and delaying the second acknowledgment when the fourth connection information and the third connection information match. In this case, the network communication apparatus further includes: a first invalidation information setting means for calculating a continuous time during which the first connection information does not match the second connection information in the comparison for each of the first connection information registered in the first table and setting information for invalidating, as a comparison target of the second connection information, the first connection information whose continuous time has exceeded a preset time in the first table in association with the first connection information; and a second invalidation information setting means for calculating a continuous time during which the third connection information does not match the fourth connection information in the comparison for each of the third connection information registered in the second table and setting information for invalidating, as a comparison target of the fourth connection information, the third connection information whose continuous time has exceeded a preset time in the second table in association with the third connection information.

In the embodiment of the present invention, when the network communication apparatus operates as a side that receives the first segments and transmits the first acknowledgment, the first connection information in the first table is compared with the second connection information included in the header of the first acknowledgment, and the first acknowledgment is delayed when those pieces of information match. On the other hand, for the first connection information whose continuous time during which a match is not obtained in the comparison has exceeded a preset time period out of the first connection information in the first table, information for invalidating the information as a comparison target is set by the first invalidation information setting means. Therefore, the first table can be prevented from being gradually enlarged, and the comparison between the first connection information in the first table and the second connection information included in the header of the first acknowledgment can be carried out efficiently. Also when the network communication apparatus of this embodiment operates as a side that transmits the second segment, the second table can be prevented from being gradually enlarged, and a comparison between the third connection information in the second table and the fourth connection information included in the header of the second acknowledgment can be carried out efficiently. As a result, a speed in a packet transmission can be increased.

In the embodiment of the present invention, the first delay means includes a first acknowledgment packet storage section capable of storing, by a first-in first-out method, a plurality of packets of the first acknowledgment judged to be delayed by the first judgment means, a first packet storage section capable of storing, by the first-in first-out method, a plurality of packets other than that of the first acknowledgment to be delayed, a first selection means for selectively extracting a packet from the first acknowledgment packet storage section and the first packet storage section, and a first timer means for starting timing with an input of the first acknowledgment to the first acknowledgment packet storage section as a trigger, causing the first selection means to select the packet of the first acknowledgment from the first acknowledgment packet storage section at a time a preset first time period passes, and causing the first selection means to select the packet other than that of the first acknowledgment from the first packet storage section at other times. In this case, the second delay means includes a second acknowledgment packet storage section capable of storing, by the first-in first-out method, a plurality of packets of the second acknowledgment judged to be delayed by the second judgment means, a second packet storage section capable of storing, by the first-in first-out method, a plurality of packets other than that of the second acknowledgment to be delayed, a second selection means for selectively extracting a packet from the second acknowledgment packet storage section and the second packet storage section, and a second timer means for starting timing with an input of the second acknowledgment to the second acknowledgment packet storage section as a trigger, causing the second selection means to select the packet of the second acknowledgment from the second acknowledgment packet storage section at a time a preset second time period passes, and causing the second selection means to select the packet other than that of the second acknowledgment from the second packet storage section at other times.

When the network communication apparatus according to the embodiment of the present invention operates as a side that receives the first segments and transmits the first acknowledgment, a delay corresponding to a first time period can be imparted to a packet of the first acknowledgment to be delayed. Also when the network communication apparatus operates as a side that transmits the second segment and receives the second acknowledgment, a delay corresponding to a second time period can be imparted to a packet of the second acknowledgment to be delayed.

According to another embodiment of the present invention, there is provided a network communication apparatus transmitting, via a network, a first acknowledgment transferred from a higher-level layer with respect to a reception of a predetermined number of first segments to a transmission source of the first segments, the network communication apparatus including: a first condition setting section in which a first condition for specifying a connection to delay the first acknowledgment is set; a first judgment means for judging whether the first acknowledgment transferred from the higher-level layer is to be delayed in accordance with the first condition set in the first condition setting section; and a transmission processing means for delaying the first acknowledgment judged to be delayed and transmitting it to the transmission source of the first segments.

According to another embodiment of the present invention, there is provided a network communication apparatus transmitting, via a network, a second segment transferred from a higher-level layer with respect to a reception of a second acknowledgment to a transmission source of the second acknowledgment, the network communication apparatus including: a second condition setting section in which a second condition for specifying a connection to delay the second acknowledgment is set; a second judgment means for judging whether the second acknowledgment received via the network is to be delayed in accordance with the second condition set in the second condition setting section; and a reception processing means for delaying the second acknowledgment judged to be delayed and transferring it to the higher-level layer.

As described above, according to the embodiments of the present invention, an acknowledgment of some specific connections out of a plurality of established connections can be delayed, and a quality of communication of other specific connections can thus be improved.

These and other objects, features and advantages of the present invention will become more apparent in light of the following detailed description of best mode embodiments thereof, as illustrated in the accompanying drawings.

BRIEF DESCRIPTION OF DRAWINGS

FIG. 5 is a diagram showing a structure of a transmission table shown in FIG. 4;

FIG. 10 are schematic diagrams for comparing a state of a delay of a transmission ACK packet by the network communication apparatus of the first embodiment with a case where control of the first embodiment is not adopted;

DESCRIPTION OF PREFERRED EMBODIMENTS

Hereinafter, embodiments of the present invention will be described with reference to the drawings.

<Typical Network Communication Apparatus>

Figure 1:
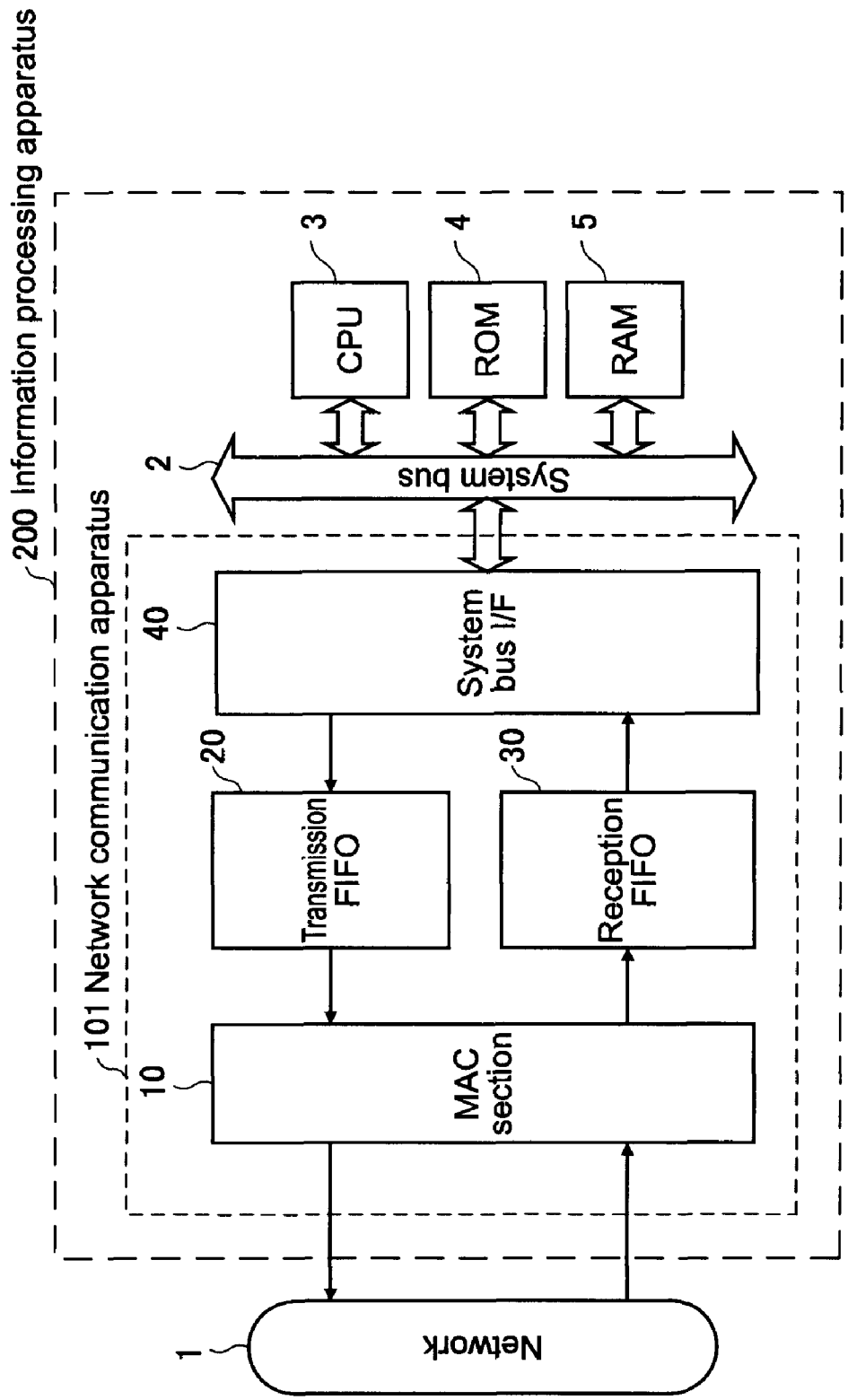
FIG. 1 is a diagram showing a structure of an information processing apparatus including a typical network communication apparatus.

FIG. 1 is a diagram showing a structure of an information processing apparatus including a typical network communication apparatus.

An information processing apparatus 200 is capable of receiving, using various application protocols such as an FTP and a streaming, contents such as a moving image, music, and a program from an apparatus as a communication counterpart connected thereto via a network 1 and using those contents.

The information processing apparatus 200 is constituted of a system bus 2, a CPU (Central Processing Unit) 3, a ROM (Read Only Memory) 4, a RAM (Random Access Memory) 5, and the like. A network communication apparatus 101 is connected to the system bus 2. The network communication apparatus 101 includes a MAC (Media Access Control) section 10, a transmission FIFO (First In First Out) 20, a reception FIFO (First In First Out) 30, and a system bus interface 40.

The MAC section 10 carries out processing in a MAC layer. The MAC layer corresponds to a lower-level sublayer of a data link layer in an OSI reference model of a network and defines a type of a frame as a data transmission/reception unit, a transmission/reception method, and the like. Specifically, the MAC section 10 adds control information such as a MAC address of a transmission destination and a MAC address of a transmission source to predetermined unit data (packet) transferred from a higher-level layer via the transmission FIFO 20 to assemble the data as a frame, and transfers the frame to a physical layer that is a lower-level layer as a bit string. The MAC section 10 also receives a frame to which its own MAC address has been added from the physical layer as the lower-level layer and transfers, as IP datagram, data obtained by removing a MAC header from the frame to the higher-level layer via the reception FIFO 30.

The transmission FIFO 20 stores, by a first-in first-out method, the IP datagram transferred from the higher-level layer via the system bus interface 40 until it is processed by the MAC section 10.

The reception FIFO 30 stores, by the first-in first-out method, the predetermined unit data extracted from the frame received via the network 1 by the MAC section 10 until it is transferred to the higher-level layer.

The system bus interface 40 controls a transfer of data among the system bus 2, the transmission FIFO 20, and the reception FIFO 30 in the information processing apparatus 200.

(Frame Structure)

Next, a typical frame structure will be described.

Figure 2:
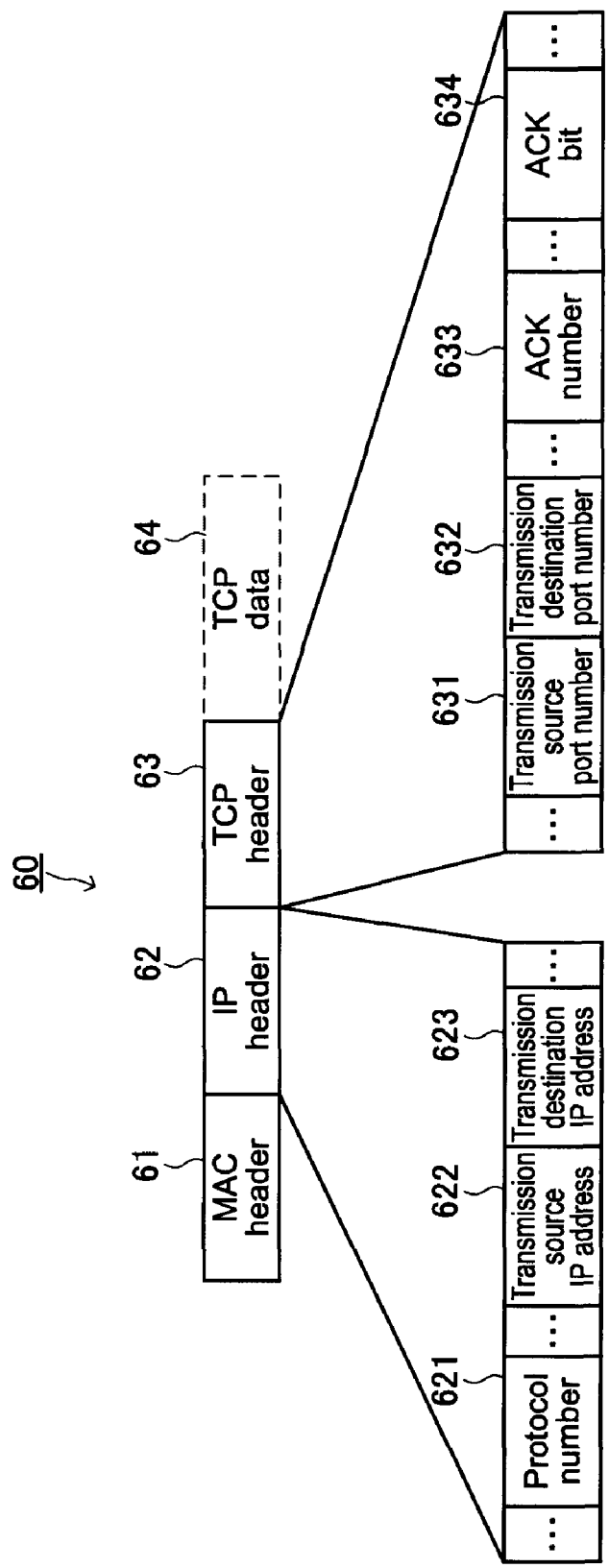
FIG. 2 is a diagram showing a frame structure.

FIG. 2 is a diagram showing the typical frame structure.

As shown in the figure, a frame 60 includes a MAC header 61, an IP header 62, a TCP header 63, a TCP data 64, and the like. The MAC header 61 has a transmission source MAC address, a transmission destination MAC address, and the like. The IP header 62 has a protocol number 621, a transmission source IP address 622, a transmission destination IP address 623, and the like. The protocol number 621 is a number that indicates a protocol of data stored in a packet. In this example, a number indicating a TCP is stored as the protocol number 621. The TCP header 63 has a transmission source port number 631, a transmission destination port number 632, an ACK number 633, an ACK bit 634, and the like. The ACK number 633 is a number obtained by adding 1 to a sequence number of a reception-completed data position. The ACK bit 634 is a flag that indicates that an area of the ACK number 633 is effective. The effectiveness of the area of the ACK number 633 indicates that the frame includes an ACK (acknowledgment) packet. It should be noted that when the frame includes an ACK packet, the frame does not include the TCP data 64.

First Embodiment

Figure 3:
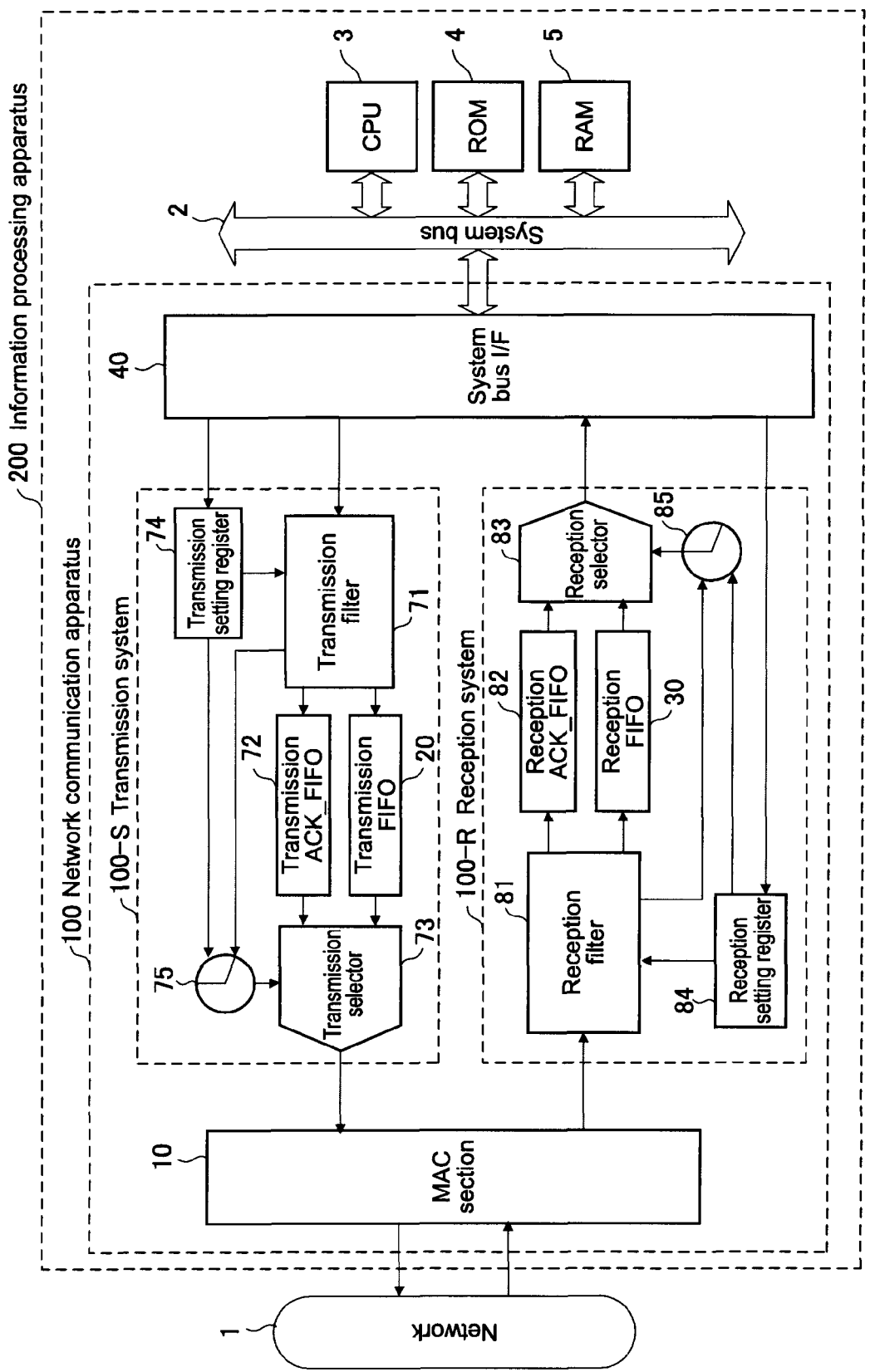
FIG. 3 is a diagram showing a structure of a network communication apparatus according to a first embodiment of the present invention.

FIG. 3 is a diagram showing a structure of a network communication apparatus 100 according to a first embodiment of the present invention.

It should be noted that data transferred among blocks shown in the figure is generally called a "packet" in a network layer and a "frame" in a data link layer (including MAC layer). However, in descriptions below, the data will collectively be referred to as "packet".

As shown in FIG. 3, the network communication apparatus 100 of this embodiment includes, in addition to the typical structure shown in FIG. 1, a transmission filter 71, a transmission ACK_FIFO 72, a transmission selector 73, a transmission setting register 74, a transmission timer 75, a reception filter 81, a reception ACK_FIFO 82, a reception selector 83, a reception setting register 84, and a reception timer 85.

The structure of the network communication apparatus 100 is roughly classified into a transmission system 100-S and a reception system 100-R. First, a structure of the transmission system 100-S of the network communication apparatus 100 will be described. The transmission system 100-S of the network communication apparatus 100 includes the transmission filter 71 (first judgment means, transmission processing means), the transmission ACK_FIFO 72 (first acknowledgment packet storage section), the transmission FIFO 20 (first packet storage section), the transmission selector 73 (first selection means), the transmission setting register 74 (first condition setting section), and the transmission timer 75 (first timer means).

The transmission filter 71 judges, based on a preset condition (hereinafter, referred to as "transmission filter condition"), whether a packet for transmission (hereinafter, referred to as "transmission packet") transferred from the higher-level layer via the system bus interface 40 is an ACK packet to be delayed. Here, the "ACK packet" refers to an acknowledgment transmitted to a transmission source with respect to a predetermined number of received segments and is structurally a TCP packet in which the ACK bit 634 is on and the TCP data 64 is not added to a tail of a header. A "data packet" is a TCP packet in which the ACK bit 634 is off and the TCP data 64 is added to the tail of the header. A "segment" refers to the TCP data 64. When judging that the transmission packet is a transmission ACK packet to be delayed, the transmission filter 71 registers connection information included in the header of the transmission ACK packet in a transmission table included in the transmission filter 71. Here, the "connection information included in the header" is an information group for specifying a connection with a communication counterpart, such as a transmission source IP address, a transmission destination IP address, a transmission source port number, and a transmission destination port number.

The transmission filter 71 also compares connection information included in a header of a transmission packet transferred from the higher-level layer via the system bus interface 40 (second connection information) and the connection information registered in the transmission table (first connection information). The transmission filter 71 judges a transmission packet that has, in the header, connection information that is the same as that registered in the transmission table and sorts and transfers, out of the relevant transmission packets, the ACK packet to the transmission ACK_FIFO 72 and other packets to the transmission FIFO 20. Regarding the transmission packets whose connection information in the header does not match any of the connection information registered in the transmission table, the transmission filter 71 transfers all the packets including the ACK packet to the transmission FIFO 20.

The transmission ACK_FIFO 72 stores, by the first-in first-out method, the transmission ACK packets transferred from the transmission filter 71 until they are processed by the MAC section 10.

The transmission FIFO 20 stores, by the first-in first-out method, the transmission packets transferred from the transmission filter 71 until they are processed by the MAC section 10.

The transmission timer 75 is a timer that starts, with a value of a delay time (first time period) set in the transmission setting register 74 as an initial value, countdown with an input of the transmission ACK packet to the transmission ACK_FIFO 72 as a trigger. The transmission timer 75 outputs a transmission ACK_FIFO selection signal to the transmission selector 73 when a count value becomes "0" by the countdown, and outputs a transmission FIFO selection signal to the transmission selector 73 when the count value is other than "0".

The transmission selector 73 selectively extracts the transmission packets from the transmission ACK_FIFO 72 and the transmission FIFO 20 and transfers them to the MAC section 10. Specifically, the transmission selector 73 selects the transmission ACK packet of the transmission ACK_FIFO 72 when a transmission ACK_FIFO selection signal is input from the transmission timer 75 and selects the transmission packet of the transmission FIFO 20 when a transmission FIFO selection signal is input, and transfers them to the MAC section 10.

The transmission setting register 74 is a register that stores the delay time set to the transmission timer 75, the transmission filter condition, and the like. The registration and a change of registered contents with respect to the transmission setting register 74 can be carried out automatically or manually based on a dedicated application program on the information processing apparatus 200 side, for example.

(Structure of Transmission Filter 71)

Next, a structure of the transmission filter 71 will be described in detail.

Figure 4:
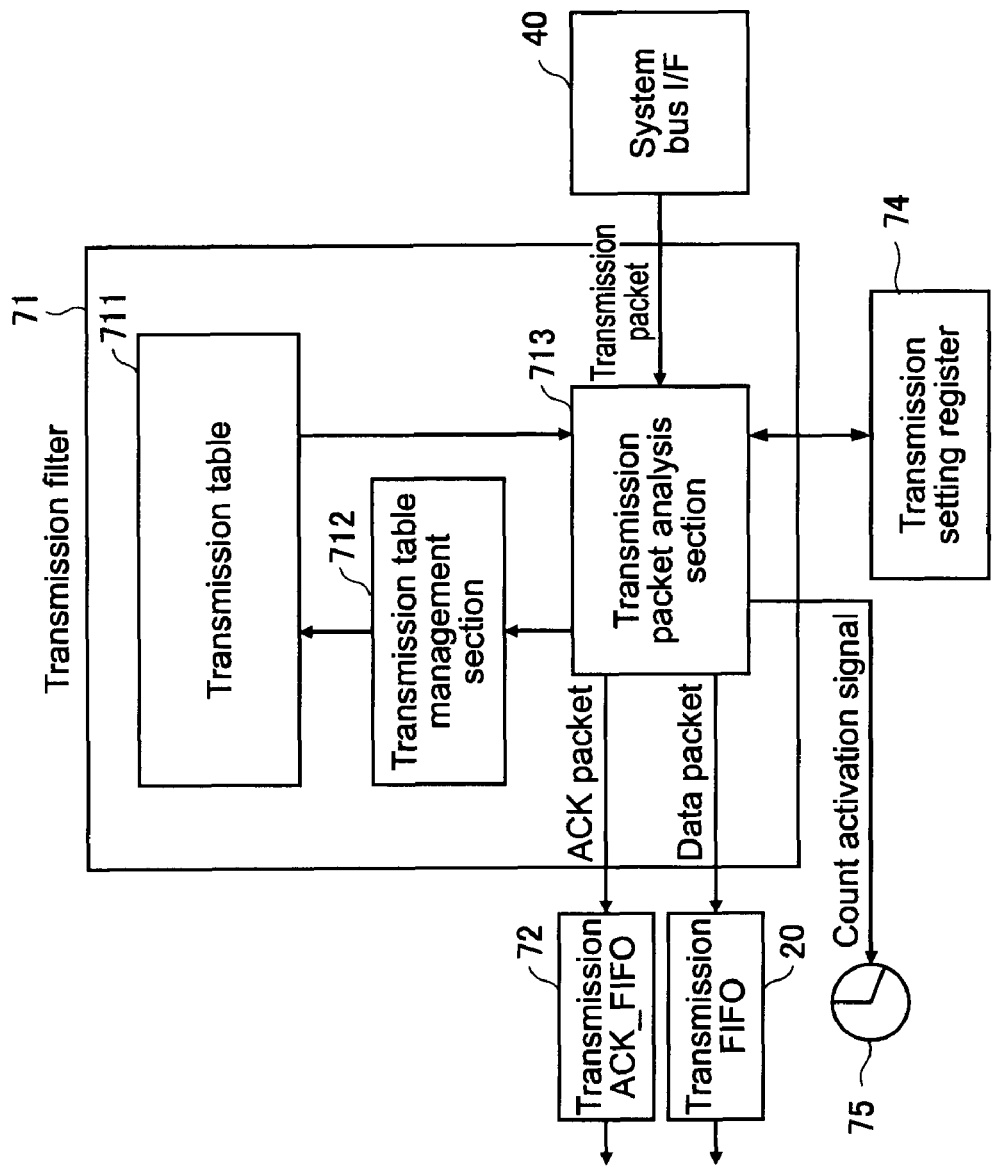
FIG. 4 is a block diagram showing a structure of a transmission filter shown in FIG. 3.

FIG. 4 is a block diagram showing the structure of the transmission filter 71. As shown in the figure, the transmission filter 71 includes a transmission table 711 (first table), a transmission table management section 712 (first table registration means), and a transmission packet analysis section 713 (first table registration means).

The transmission packet analysis section 713 carries out the following three processing.

(Processing 1: Information Registration of Packet to be Delayed)

The transmission packet analysis section 713 checks the header of the transmission packet transferred from the higher-level layer via the system bus interface 40 and judges whether the transmission packet is a transmission ACK packet to be delayed based on the transmission filter condition set in the transmission setting register 74. When judging that the transmission packet is a transmission ACK packet to be delayed, the transmission packet analysis section 713 extracts the connection information from the transmission ACK packet and requests the transmission table management section 712 to register the connection information in the transmission table 711.

(Processing 2: Sorting of Transmission ACK Packets)

The transmission packet analysis section 713 compares the connection information included in the header of the transmission packet transferred from the higher-level layer via the system bus interface 40 with effective connection information registered in the transmission table 711. The transmission packet analysis section 713 detects a transmission packet that has, in the header, connection information that is the same as any of the effective connection information registered in the transmission table 711. When the transmission packet is an ACK packet, the transmission packet analysis section 713 sorts and transfers the transmission packet to the transmission ACK_FIFO 72, and when the transmission packet is other than the ACK packet, sorts and transfers the transmission packet to the transmission FIFO 20. Moreover, regarding the transmission packets whose connection information in the header does not match any of the effective connection information registered in the transmission table 711, the transmission packet analysis section 713 transfers all the packets including the ACK packet to the transmission FIFO 20. The transmission packet analysis section 713 also supplies a count activation signal to the transmission timer 75 when transferring the transmission ACK packet to the transmission ACK_FIFO 72.

(Processing 3: Invalidation of Table Information)

The transmission packet analysis section 713 carries out processing of invalidating the connection information of the transmission table 711 not once hit by the comparison between the connection information within an invalidation judgment time period set in the transmission setting register 74.

As the order in which the transmission packet analysis section 713 carries out Processing 1 and Processing 2, Processing 2 is carried out first and then Processing 1. This is because Processing 1 becomes unnecessary when the connection information in the header of the transmission ACK packet matches any of the connection information registered in the transmission table 711 and the transmission ACK packet is transferred to the transmission ACK_FIFO 72 in Processing 2. Therefore, Processing 1 only needs to be carried out after Processing 2, and Processing 1 is skipped when the match is judged in Processing 2. Processing 3 is carried out in association with Processing 2.

The transmission packet analysis section 713 judges a transmission ACK packet satisfying the transmission filter condition as a transmission ACK packet to be delayed in Processing 1. The transmission packet analysis section 713 requests the transmission table management section 712 to register the connection information included in the header of that transmission ACK packet in the transmission table 711 and set to the registered connection information an effective flag indicating that the information is effective.

In response to the request from the transmission packet analysis section 713, the transmission table management section 712 registers the connection information included in the header of the transmission ACK packet in the transmission table 711 and sets to the registered connection information an effective flag indicating that the information is effective. At this time, the connection information that is the same as the connection information of the transmission ACK packet may already be registered in the transmission table 711 in a state where the effective flag is off. In this case, the transmission table management section 712 only needs to reset the effective flag to be on. The effective flag will be described later in detail.

(Transmission Filter Condition)

Next, the transmission filter condition will be described. The following conditions can be set to the transmission setting register 74 as the transmission filter condition.

(Transmission filter condition 1) Transmission destination IP address: Needs to be transmission ACK packet that includes specific transmission destination IP address in header. Here, "transmission destination" is transmission destination of ACK packet.

(Transmission filter condition 2) Combination of transmission source port number and transmission destination port number: Needs to be transmission ACK packet including combination of transmission source port number and transmission destination port number corresponding to specific application protocol in header.

(Transmission filter condition 3) Transmission rate of transmission ACK packet: Transmission rate of transmission ACK packet needs to be setting value or more.

For the transmission filter conditions, a setting of effectiveness/ineffectiveness and a setting of a detailed content can be made individually by a user. For example, an individual transmission destination IP address or a range thereof can be set to the transmission destination IP address of the transmission filter condition 1. An individual port number or a range thereof can be set to the transmission source port number and the transmission destination port number of the transmission filter condition 2. A default value is set to the setting value of the transmission filter condition 3, and the user is capable of setting a specific numerical value. Furthermore, statuses of the effectiveness/ineffectiveness of the transmission filter conditions set in the transmission setting register 74 can be switched individually by a user command as needed. Here, the transmission filter condition set with an ineffective status is handled as a wasteful transmission filter condition in the judgment processing though its content is stored in the transmission setting register 74.

(Structure of Transmission Table 711)

Next, a structure of the transmission table 711 will be described.

FIG. 5 is a diagram showing the structure of the transmission table 711.

As shown in the figure, in the transmission table 711, an effective flag and a last hit time are registered together with connection information such as a transmission source IP address, a transmission destination IP address, a transmission source port number, and a transmission destination port number.

The effective flag is information for identifying whether corresponding connection information in the transmission table 711 is effective information to be compared with the connection information of the transmission packet in the sorting processing of the transmission ACK packets carried out by the transmission packet analysis section 713. For example, the effective flag indicates effectiveness when it is on. The effective flag of the connection information judged to be made ineffective by Processing 3 of the transmission packet analysis section 713 is switched from on to off by the transmission table management section 712 in response to a request from the transmission packet analysis section 713. Therefore, when the connection flag that has been made ineffective is to be made effective again after that, the corresponding effective flag only needs to be reset to on. As a result, a load required for updating the transmission table 711 can be kept low, and a communication speed can be increased.

The last hit time is a time of a last hit of the connection information of the transmission ACK packet in the sorting processing of the transmission ACK packets by the transmission packet analysis section 713. The "hit" means that the effective connection information registered in the transmission table 711 has matched the connection information of the transmission ACK packet. It should be noted that in the case of the connection information not once hit since having been registered in the transmission table 711 for the first time, a first registration time thereof becomes the last hit time. The transmission packet analysis section 713 monitors a lapse time since the last hit time and judges that the corresponding connection information in the transmission table 711 is to be made ineffective when the lapse time becomes equal to or longer than the invalidation judgment time period set in the transmission setting register 74.

Next, referring back to FIG. 3, a structure of the reception system 100-R of the network communication apparatus 100 of this embodiment will be described. The reception system 100-R of the network communication apparatus 100 includes the reception filter 81 (second judgment means, reception processing means), the reception ACK_FIFO 82 (second acknowledgment packet storage section), the reception FIFO 30 (second packet storage section), the reception selector 83 (second selection means), the reception setting register 84 (second condition setting section), and the reception timer 85 (second timer means).

The reception filter 81 judges, based on a preset condition (hereinafter, referred to as "reception filter condition"), whether a packet for reception (hereinafter, referred to as "reception packet") transferred from the MAC section 10 is an ACK packet to be delayed. When judging that the reception packet is a reception ACK packet to be delayed, the reception filter 81 registers connection information included in the header of the reception ACK packet in a reception table inside the reception filter 81.

The reception filter 81 also compares connection information included in a header of a reception packet transferred from the MAC section 10 (fourth connection information) and the connection information registered in the reception table (third connection information). The reception filter 81 judges a reception packet that has, in the header, connection information that is the same as that registered in the reception table and sorts and transfers, out of the relevant reception packets, the ACK packet to the reception ACK_FIFO 82 and other packets to the reception FIFO 30. Regarding the reception packets whose connection information in the header does not match any of the connection information registered in the reception table, the reception filter 81 transfers all the packets including the ACK packet to the reception FIFO 30.

The reception ACK_FIFO 82 stores, by the first-in first-out method, the ACK packets transferred from the reception filter 81 until they are transferred to the higher-level layer via the system bus interface 40.

The reception FIFO 30 stores, by the first-in first-out method, all the packets transferred from the reception filter 81 until they are transferred to the higher-level layer via the system bus interface 40.

The reception timer 85 is a timer that starts, with a value of a delay time (second time period) set in the reception setting register 84 as an initial value, countdown with an input of the reception ACK packet to the reception ACK_FIFO 82 as a trigger. The reception timer 85 outputs a reception ACK_FIFO selection signal to the reception selector 83 when a count value becomes "0" by the countdown, and outputs a reception FIFO selection signal to the reception selector 83 when the count value is other than "0".

The reception selector 83 selectively extracts the reception packets from the reception ACK_FIFO 82 and the reception FIFO 30 and transfers them to the higher-level layer via the system bus interface 40. Specifically, the reception selector 83 selects the reception ACK packet of the reception ACK_FIFO 82 when a reception ACK_FIFO selection signal is input from the reception timer 85 and selects the reception packet of the reception FIFO 30 when a reception FIFO selection signal is input, and transfers them to the higher-level layer via the system bus interface 40.

The reception setting register 84 is a register that stores the delay time set to the reception timer 85, the reception filter condition, and the like. The registration and a change of registered contents with respect to the reception setting register 84 can be carried out automatically or manually based on a dedicated application program on the information processing apparatus 200 side, for example.

(Structure of Reception Filter 81)

Next, a structure of the reception filter 81 will be described in detail.

Figure 6:
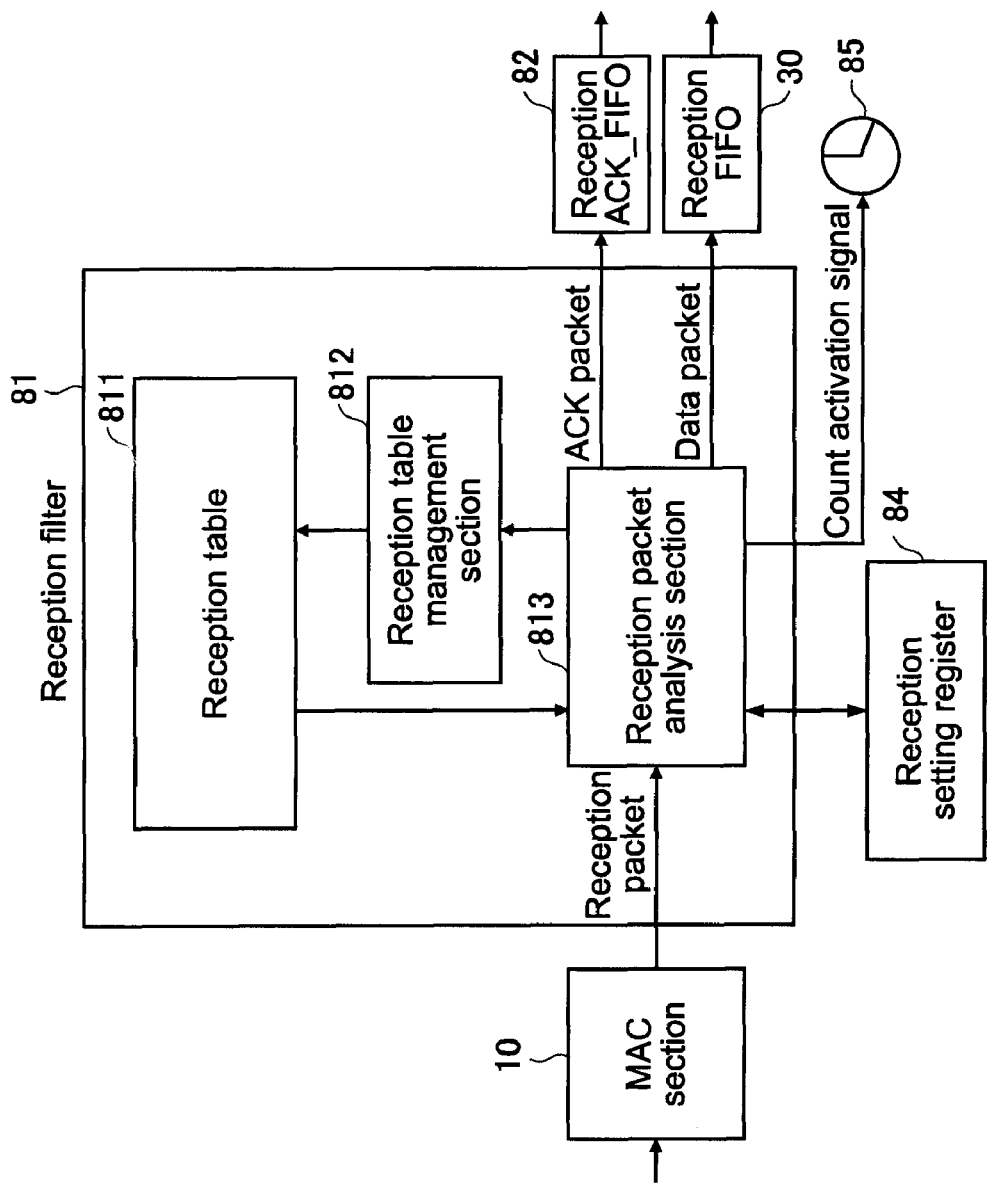
FIG. 6 is a block diagram showing a structure of a reception filter shown in FIG. 3.

FIG. 6 is a block diagram showing the structure of the reception filter 81. As shown in the figure, the structure of the reception filter 81 is basically the same as that of the transmission filter 71. Specifically, the reception filter 81 includes a reception table 811 (second table), a reception table management section 812 (second table registration means), and a reception packet analysis section 813 (second table registration means).

The reception packet analysis section 813 checks a header of the reception packet transferred from the MAC section 10 and carries out processing that are the same as Processing 1 to 3 carried out by the transmission packet analysis section 713.

In other words, the reception packet analysis section 813 carries out the following three processing.

(Processing 1': Information registration of packet to be delayed)

The reception packet analysis section 813 checks the header of the reception packet transferred from the MAC section 10 and judges whether the reception packet is a reception ACK packet to be delayed based on the reception filter condition set in the reception setting register 84. When judging that the reception packet is a reception packet to be delayed, the reception packet analysis section 813 extracts the connection information from the reception packet and requests the reception table management section 812 to register the connection information in the reception table 811.

(Processing 2': Sorting of Reception ACK Packets)

The reception packet analysis section 813 compares the connection information included in the header of the reception packet transferred from the MAC section 10 with effective connection information registered in the reception table 811. The reception packet analysis section 813 detects a reception packet that has, in the header, connection information that is the same as any of the effective connection information registered in the reception table 811. When the reception packet is an ACK packet, the reception packet analysis section 813 sorts and transfers the reception packet to the reception ACK_FIFO 82, and when the reception packet is other than the ACK packet (data packet), the reception packet analysis section 813 sorts and transfers the reception packet to the reception FIFO 30. Moreover, regarding the reception packets whose connection information in the header does not match any of the effective connection information registered in the reception table 811, the reception packet analysis section 813 transfers all the packets including the ACK packet to the reception FIFO 30. The reception packet analysis section 813 also supplies a count activation signal to the reception timer 85 when transferring the reception ACK packet to the reception ACK_FIFO 82.

(Processing 3': Invalidation of Table Information)

The reception packet analysis section 813 carries out processing of invalidating the connection information of the reception table 811 not once hit by the comparison between the connection information within an invalidation judgment time period set in the reception setting register 84.

As the order in which the reception packet analysis section 813 carries out Processing 1' and Processing 2', Processing 2' is carried out first and then Processing 1'. The reason is the same as that described in the description on the transmission packet analysis section 713. Processing 3' is carried out in association with Processing 2'.

The reception packet analysis section 813 judges a reception ACK packet satisfying the reception filter condition as a reception ACK packet to be delayed in Processing 1'. The reception packet analysis section 813 requests the reception table management section 812 to register the connection information included in the header of that reception ACK packet in the reception table 811 and set to the registered connection information an effective flag indicating that the information is effective.

In response to the request from the reception packet analysis section 813, the reception table management section 812 registers the connection information included in the header of the reception ACK packet in the reception table 811 and sets to the registered connection information an effective flag indicating that the information is effective. At this time, the connection information that is the same as the connection information of the reception ACK packet may already be registered in the reception table 811 in a state where the effective flag is off. In this case, the reception table management section 812 only needs to reset the effective flag to be on.

(Reception Filter Condition)

Next, the reception filter condition will be described. The following conditions can be set to the reception setting register 84 as the reception filter condition.

(Reception filter condition 1') Transmission source IP address: Needs to be reception ACK packet that includes specific transmission source IP address in header. Here, "transmission source" is transmission source of ACK packet.

(Reception filter condition 2') Combination of transmission source port number and transmission destination port number: Needs to be reception ACK packet including combination of transmission source port number and transmission destination port number corresponding to specific application protocol in header.

(Reception filter condition 3') Reception rate of reception ACK packet: Reception rate of reception ACK packet needs to be setting value or more.

For the reception filter conditions, a setting of effectiveness/ineffectiveness and a setting of a detailed content can be made individually. For example, an individual transmission source IP address or a range thereof can be set to the transmission source IP address of the reception filter condition 1'. An individual port number or a range thereof can be set to the transmission source port number and the transmission destination port number of the reception filter condition 2'. A default value is set to the setting value of the reception filter condition 3', and the user is capable of setting a specific numerical value. Furthermore, statuses of the effectiveness/ineffectiveness of the reception filter conditions set in the reception setting register 84 can be switched individually by a user command as needed. Here, the reception filter condition set with an ineffective status is handled as a wasteful reception filter condition in the judgment processing though its content is stored in the reception setting register 84.

(Structure of Reception Table 811)

Since the structure of the reception table 811 is the same as that of the transmission table 711, descriptions thereof will be omitted.

(Operation of Network Communication Apparatus 100 of this Embodiment)

Next, an operation of the network communication apparatus 100 of this embodiment will be described.

(Operation at Time of Packet Transmission)

First, an operation carried out at a time of a packet transmission will be described.

Figure 7:
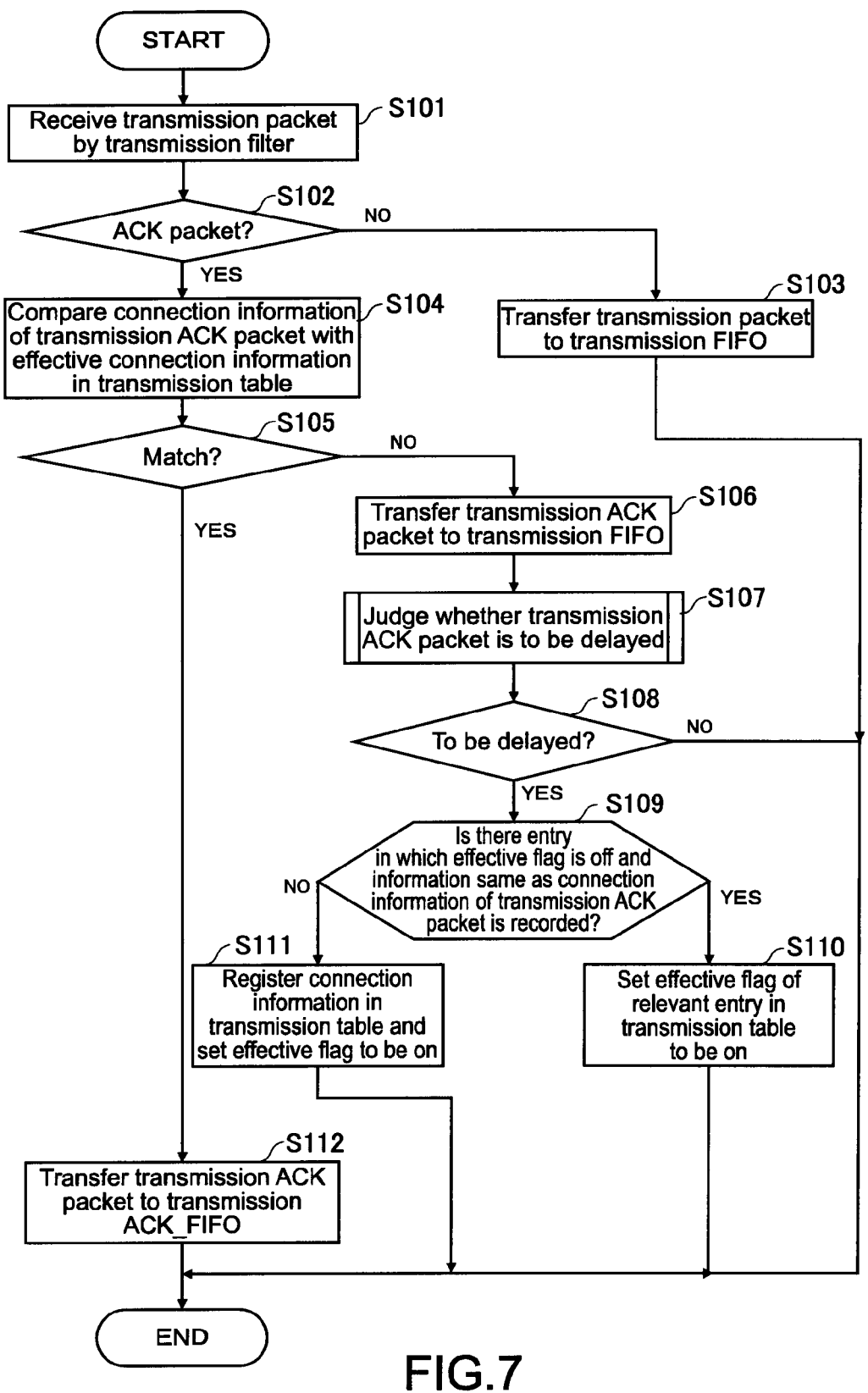
FIG. 7 is a flowchart of packet transmission processing.

FIG. 7 is a flowchart of packet transmission processing.

A transmission packet is transferred to the transmission filter 71 from the higher-level layer via the system bus interface 40. When the transmission packet is received by the transmission filter 71 (Step S101), the transmission packet analysis section 713 checks the ACK bit 634 included in a header of the transmission packet (see FIG. 2) and judges whether the transmission packet is an ACK packet (Step S102). When the transmission packet is not an ACK packet (NO in Step S102), the transmission packet analysis section 713 transfers the transmission packet to the transmission FIFO 20 (Step S103). The transmission packet stored in the transmission FIFO 20 is transferred to the MAC section 10 when selected by the transmission selector 73 and transmitted through the network 1 after being subjected to MAC layer processing. The operation of the transmission selector 73 will be described later in detail.

When judged in Step S102 that the transmission packet is an ACK packet (YES in Step S102), the transmission packet analysis section 713 compares connection information included in the header of the transmission ACK packet with effective connection information registered in the transmission table 711 (Step S104).

When the connection information of the transmission ACK packet matches any of the effective connection information registered in the transmission table 711 (YES in Step S105), the transmission packet analysis section 713 transfers the transmission ACK packet to the transmission ACK_FIFO 72 as a transmission ACK packet to be delayed (Step S112). As in the case described above, the transmission ACK packet stored in the transmission ACK_FIFO 72 is transferred to the MAC section 10 when selected by the transmission selector 73 and transmitted through the network 1 after being subjected to the MAC layer processing.

When judged in Step S105 that the connection information of the transmission ACK packet does not match any of the effective connection information registered in the transmission table 711 (NO in Step S105), the transmission packet analysis section 713 transfers the transmission ACK packet to the transmission FIFO 20 as a transmission ACK packet not to be delayed (Step S106). After that, the transmission packet analysis section 713 judges whether the transmission ACK packet is a transmission ACK packet to be delayed based on the filter condition set in the transmission setting register 74 (Step S107). This judgment processing will be described later in detail.

When judged NO (NO in Step S108), the transmission packet analysis section 713 judges that the transmission ACK packet is as packet not to be delayed and ends the processing. When judged YES (YES in Step S108), the transmission packet analysis section 713 judges whether there is an entry in the transmission table 711 in which the effective flag is off and connection information that is the same as the connection information included in the transmission ACK packet is recorded (Step S109).

When judged YES in Step S109 (YES in Step S109), the transmission packet analysis section 713 changes the effective flag of that entry from off to on for making the connection information of the entry effective (Step S110). On the other hand, when judged NO in Step S109 (NO in Step S109), the transmission packet analysis section 713 newly registers the connection information of the transmission packet in the transmission table 711 and sets the effective flag corresponding to that connection information to on (Step S111).

After that, the transmission ACK packet having, in a header, the connection information that has been made effective in Step S110 or S111 is regarded as a transmission ACK packet to be delayed by the comparison of Step S104 at a time the transmission ACK packet is received by the transmission packet analysis section 713 and transferred to the transmission ACK_FIFO 72 (Step S112).

(Information Registration Processing of Packet to be Delayed on ACK-Transmission Side)

Next, information registration processing of a packet to be delayed of Step S107 will be described.

Figure 8:
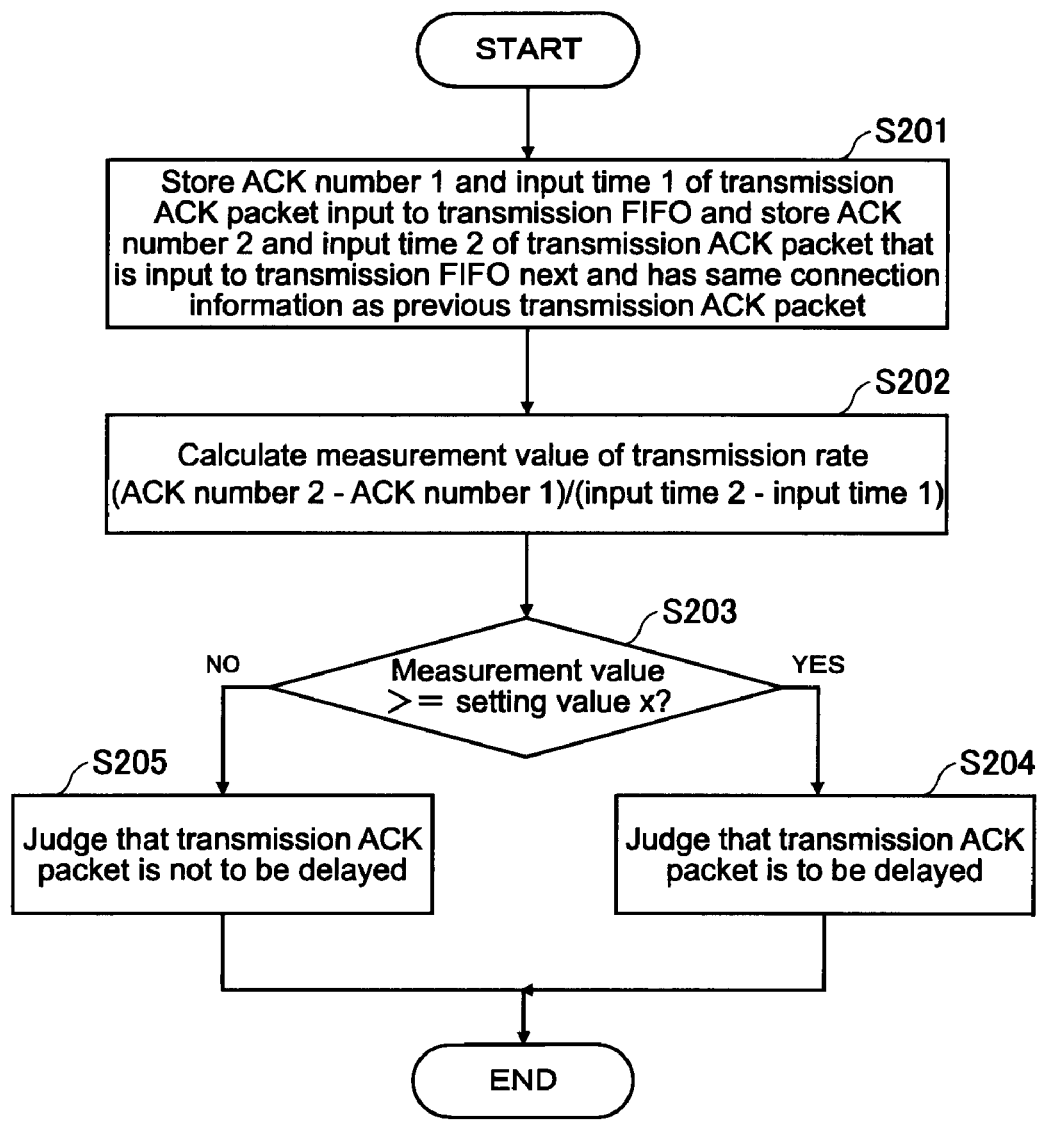
FIG. 8 is a flowchart showing an example of information registration processing of a packet to be delayed on an ACK-transmission side.

FIG. 8 is a flowchart showing an example of the information registration processing of a packet to be delayed on the ACK-transmission side. It should be noted that the actual judgment processing depends on the transmission filter condition set to the transmission setting register 74 by the user. The flowchart of FIG. 8 shows an example of the judgment processing in a case where the transmission filter condition 3 is made effective and "x" is set as a setting value of a transmission rate of a transmission ACK packet.

The transmission packet analysis section 713 monitors transmission ACK packets that are input to the transmission FIFO 20 and have the same connection information in the header, and obtains a transmission rate by the following operation. The transmission packet analysis section 713 stores an ACK number 1 and an input time 1 of a transmission ACK packet first input to the transmission FIFO 20 since having started the monitoring. When a transmission ACK packet that has the same connection information as the previous transmission ACK packet is input to the transmission FIFO 20, the transmission packet analysis section 713 stores an ACK number 2 and an input time 2 of that transmission ACK packet (Step S201). Then, the transmission packet analysis section 713 carries out a calculation (ACK number 2–ACK number 1)/(input time 2–input time 1) and uses a value obtained as a result of the calculation as a measurement value of the transmission rate of the transmission ACK packet (Step S202).

Next, the transmission packet analysis section 713 compares the obtained measurement value with the setting value x of the transmission rate of the transmission filter condition 3 set in the transmission setting register 74 (Step S203). When the measurement value of the transmission rate of the transmission ACK packet is equal to or larger than the setting value x as a result of the comparison (YES in Step S203), the transmission packet analysis section 713 judges that the transmission ACK packet is a packet to be delayed (Step S204). On the other hand, when the measurement value of the transmission rate of the transmission ACK packet is smaller than the setting value x (NO in Step S203), the transmission packet analysis section 713 judges that the transmission ACK packet is a packet not to be delayed (Step S205).

The above descriptions have been given on the information registration processing of a packet to be delayed in the case where the transmission filter condition 3 is made effective. However, when the transmission filter condition 1 is additionally made effective, a transmission ACK packet to be a target of the process of Step S201 is narrowed down to a transmission ACK packet that has, in the header, a transmission destination IP address set as the transmission filter condition 1. Similarly, when the transmission filter condition 2 is additionally made effective, a transmission ACK packet to be a target of the process of Step S201 is narrowed down to a transmission ACK packet that has, in the header, a transmission source port number and a transmission destination port number set as the transmission filter condition 2.

(Delay Processing of Transmission ACK Packet)

Next, an operation of delay processing of a transmission ACK packet after transmission ACK packets are sorted and transferred to the transmission ACK_FIFO 72 and the transmission FIFO 20 in Steps S112 and S103, respectively, will be described.

Timings of extracting packets from the transmission ACK_FIFO 72 and the transmission FIFO 20 are generated by the transmission timer 75 and the transmission selector 73. At this time, the timing of extracting a transmission ACK packet from the transmission ACK_FIFO 72 is controlled to be delayed a time period corresponding to a delay time set in the transmission setting register 74 from the timing at which that transmission ACK packet is input to the transmission ACK_FIFO 72. This operation will be described below in detail.

Figure 9:
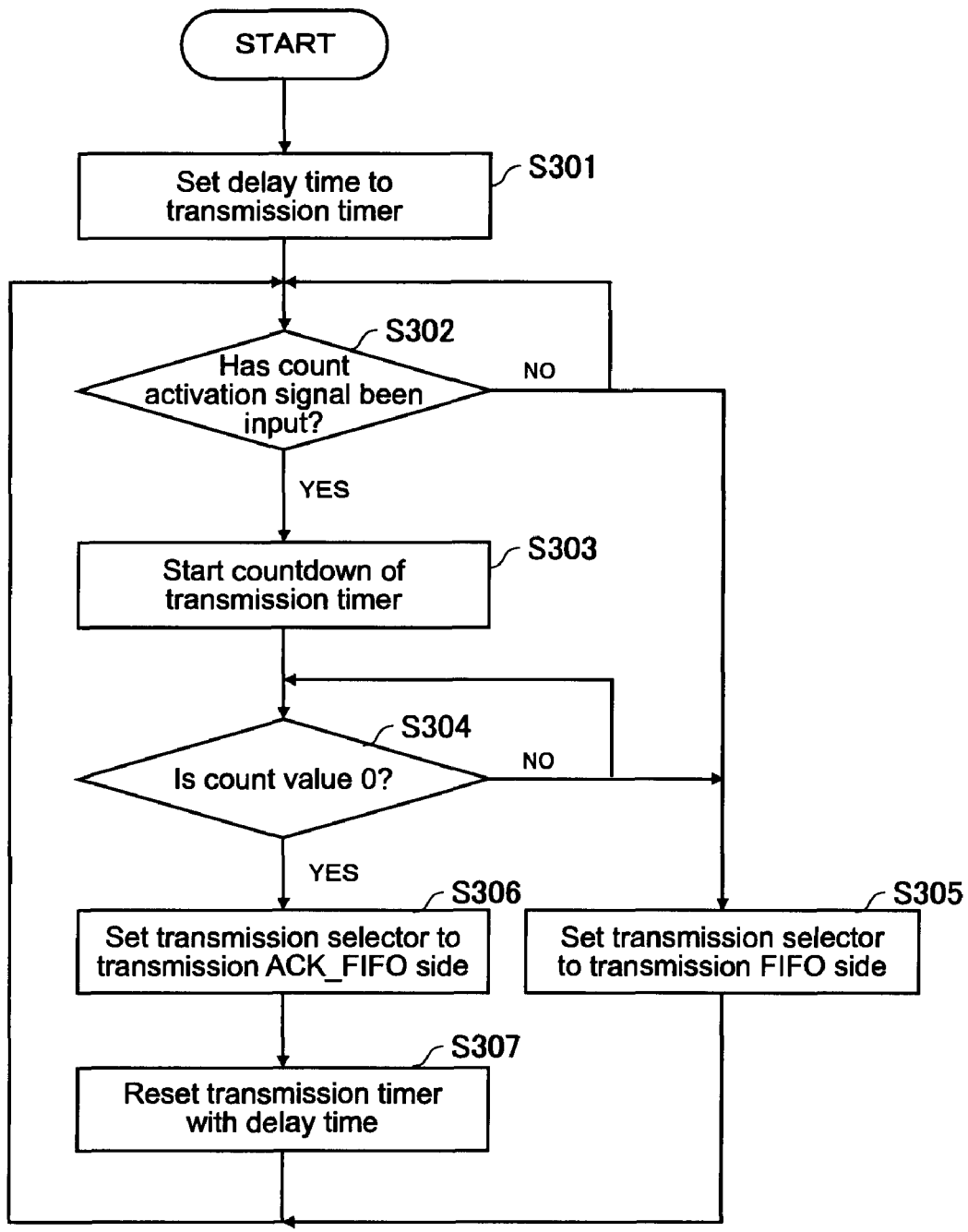
FIG. 9 is a flowchart showing an operation of delay processing of a transmission ACK packet.

FIG. 9 is a flowchart showing the operation of the delay processing of a transmission ACK packet.

The transmission timer 75 is initialized to a value of the delay time set in the transmission setting register 74 (Step S301). This initialization is carried out right after the network communication apparatus 100 is activated, for example.

With an input of a count activation signal output from the transmission packet analysis section 713 every time the transmission packet analysis section 713 transfers one transmission ACK packet to the transmission ACK_FIFO 72 as a trigger (YES in Step S302), the transmission timer 75 starts countdown (Step S303).

The transmission timer 75 outputs a transmission FIFO selection signal to the transmission selector 73 before starting the countdown and right before the count value becomes "0" since having started the countdown (NO in Step S302 and NO in Step S304). While the transmission FIFO selection signal is being input, the transmission selector 73 selects a transmission packet (data packet) of the transmission FIFO 20 (Step S305) and transfers it to the MAC section 10.

On the other hand, when the count value of the transmission timer 75 reaches "0" (YES in Step S304), the transmission timer 75 outputs a transmission ACK_FIFO selection signal to the transmission selector 73. The transmission selector 73 selects a transmission ACK packet of the transmission ACK_FIFO 72 according to the input transmission ACK_FIFO selection signal (Step S306) and transfers it to the MAC section 10.

After outputting the transmission ACK_FIFO selection signal to the transmission selector 73, the transmission timer 75 is reset to the delay time value set in the transmission setting register 74 (Step S307). After that, the same control is repeated from Step S302.

By such control, it becomes possible to delay the timing of transmitting the transmission ACK packet satisfying a specific transmission filter condition through the network 1.

FIG. 10 are schematic diagrams for comparing a state of a delay of a transmission ACK packet by the network communication apparatus 100 of this embodiment with a case where control of this embodiment is not adopted. Here, FIG. 10A shows the case where the control of this embodiment is not adopted, and FIG. 10B shows the case where the control of this embodiment is adopted. Here, FIG. 10 assume a case where an ACK packet is sent back with respect to a reception of two data packets. It can be seen that, in the case where the control of this embodiment is adopted as shown in FIG. 10B, due to a delay time caused before an ACK packet is transmitted after the second data packets is received, a reception timing of a next data packet is delayed, with the result that a communication band consumed can be reduced.

(Method of Restricting Communication Band of Specific Application Protocol on ACK-Transmission Side)

Next, a method of restricting a communication band of a specific application protocol on the ACK-transmission side will be described.

As the "combination of transmission source port number and transmission destination port number" of the transmission filter condition 2, a combination of a transmission source port number and a transmission destination port number corresponding to an application protocol whose communication band to be used is to be restricted is set in the transmission setting register 74. At this time, the transmission filter condition 1 and the transmission filter condition 3 only need to be set as necessary. Specifically, the transmission filter condition 1 only needs to be set when the communication band of the application protocol with respect to a specific ACK transmission destination is to be restricted. Moreover, the setting of the transmission filter condition 3 only needs to be added when a communication band of a specific application protocol is to be additionally restricted depending on a transmission rate of a transmission ACK packet.

Next, information registration processing of a packet to be delayed in a case where a transmission source port number and a transmission destination port number corresponding to a specific application protocol are set as the transmission filter condition 2 and a setting value of a transmission rate of a transmission ACK packet of the transmission filter condition 3 is set will be described.

Figure 11:
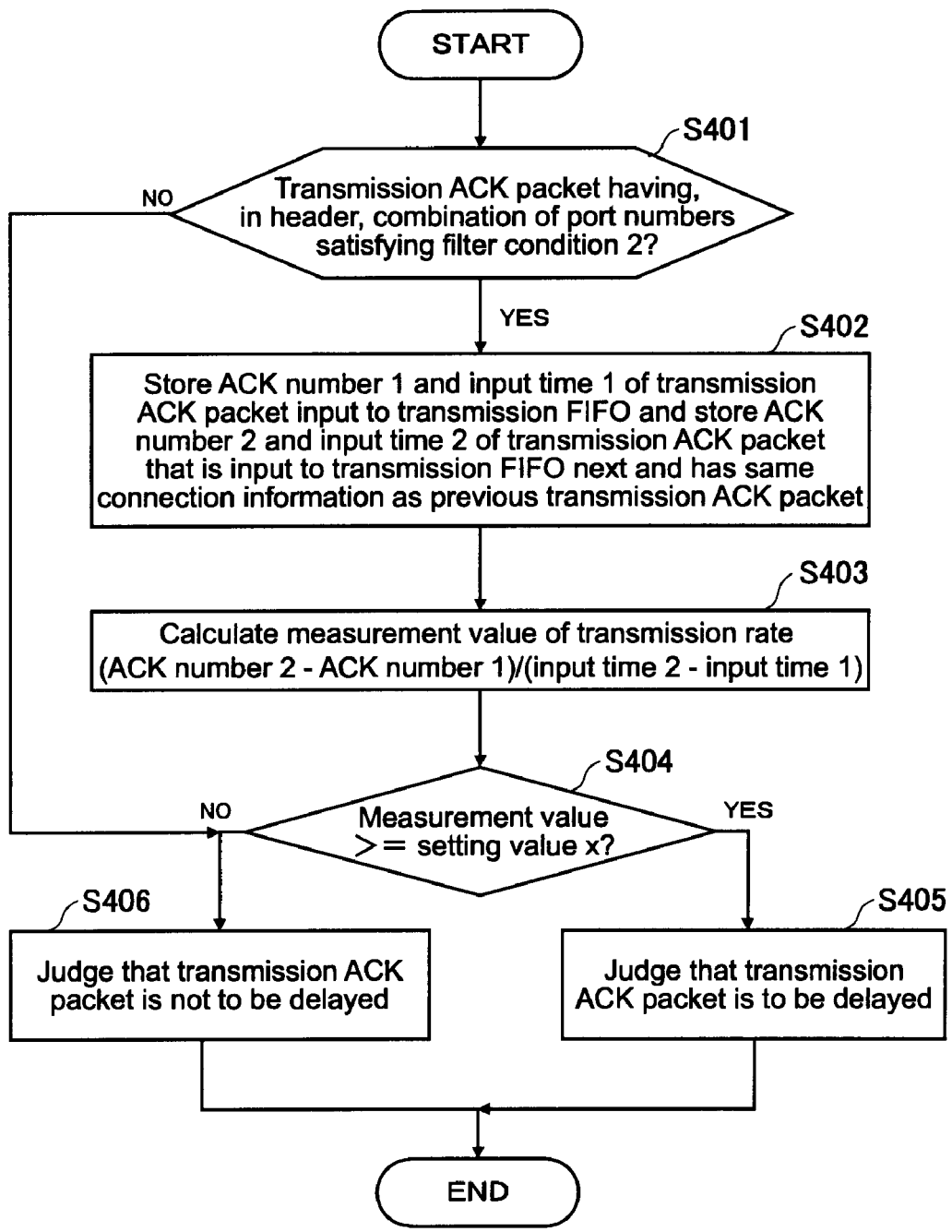
FIG. 11 is a flowchart of another information registration processing of a packet to be delayed on the ACK-transmission side.

FIG. 11 is a flowchart of the information registration processing of a packet to be delayed.

The transmission packet analysis section 713 checks a combination of a transmission source port number and a transmission destination port number included in a header of a transmission ACK packet transferred to the transmission FIFO 20. The transmission packet analysis section 713 judges whether the combination matches any of the combinations of the transmission source port number and the transmission destination port number set in the transmission setting register 74 as the transmission filter condition 2 (Step S401).

When the combination does not match any of the combinations (NO in Step S401), the transmission packet analysis section 713 judges that the transmission ACK packet is a packet not to be delayed (Step S406). On the other hand, when there is a match (YES in Step S401), the transmission packet analysis section 713 monitors transmission ACK packets that are input to the transmission FIFO 20 and have the same connection information in the header, and obtains a transmission rate by the following operation. The transmission packet analysis section 713 stores an ACK number 1 and an input time 1 of a transmission ACK packet first input to the transmission FIFO 20 since having started the monitoring. When a transmission ACK packet that has the same connection information as the previous transmission ACK packet is input to the transmission FIFO 20, the transmission packet analysis section 713 stores an ACK number 2 and an input time 2 of that transmission ACK packet (Step S402). Then, the transmission packet analysis section 713 carries out a calculation (ACK number 2−ACK number 1)/(input time 2−input time 1) and uses a value obtained as a result of the calculation as a measurement value of the transmission rate of the transmission ACK packet (Step S403).

The operation after that is the same as that of the flowchart of FIG. 8. Specifically, the transmission packet analysis section 713 compares the obtained measurement value of the transmission rate with the setting value x of the transmission rate of the transmission filter condition 3 set in the transmission setting register 74 (Step S404). When the measurement value of the transmission rate of the transmission ACK packet is equal to or larger than the setting value x (YES in Step S404), the transmission packet analysis section 713 judges that the transmission ACK packet is a packet to be delayed (Step S405). On the other hand, when the measurement value of the transmission rate of the transmission ACK packet is smaller than the setting value x (NO in Step S404), the transmission packet analysis section 713 judges that the transmission ACK packet is a packet not to be delayed (Step S406).

An operation of selectively extracting packets from the transmission FIFO 20 and the transmission ACK_FIFO 72 after that by the transmission timer 75 and the transmission selector 73 and transferring them to the MAC section 10 is the same as that described above.

(Processing of Invalidating Registration Information in Transmission Table 711)

Figure 12:
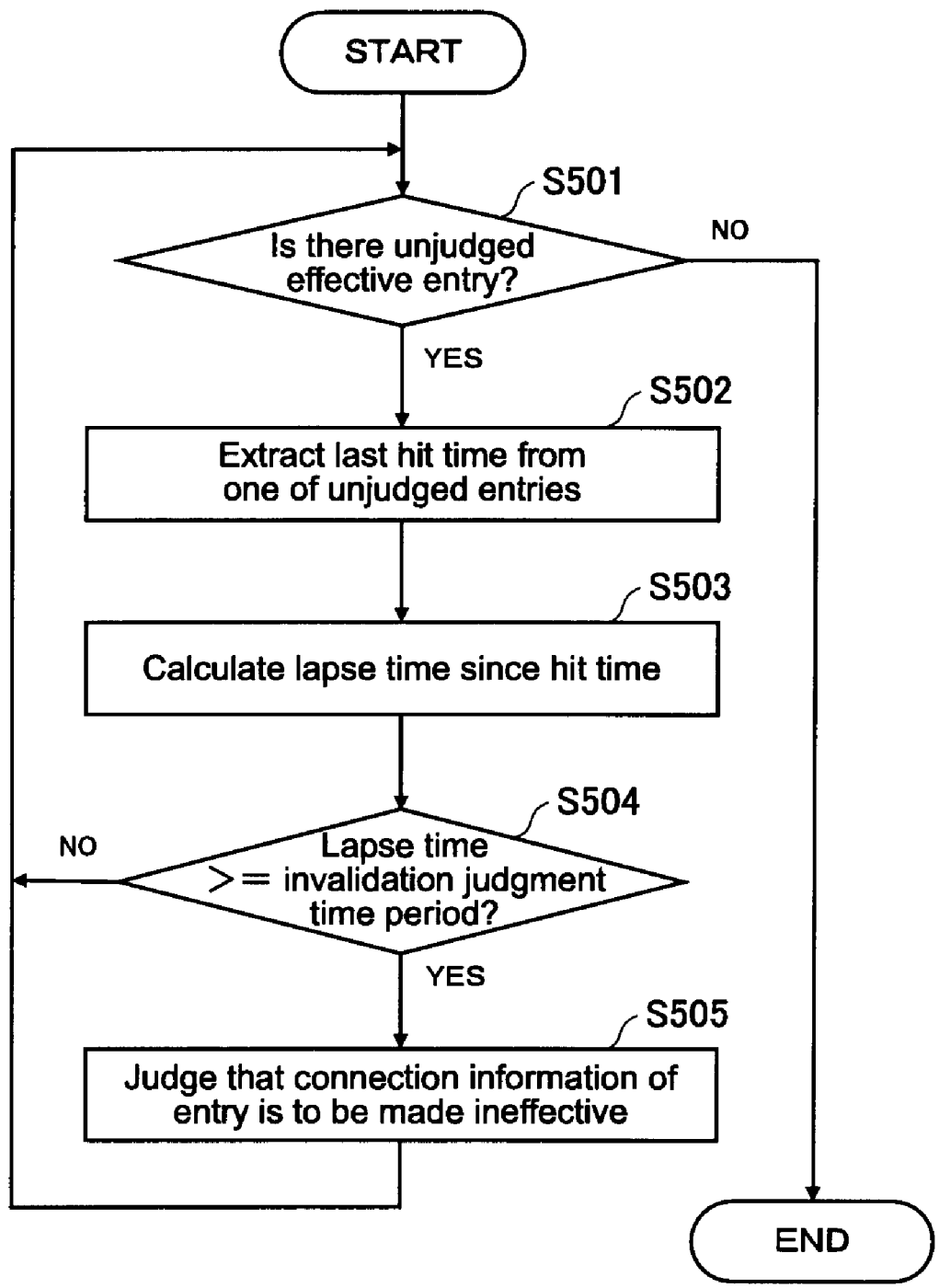
FIG. 12 is a flowchart of processing of invalidating registration information in the transmission table.

FIG. 12 is a flowchart of processing of invalidating registration information in the transmission table 711.

The transmission packet analysis section 713 starts the following invalidation processing periodically, for example, every time the information registration processing of a packet to be delayed is ended or in certain time cycles. First, the transmission packet analysis section 713 judges whether there is an entry in the transmission table 711 that includes effective connection information that is yet unjudged (Step S501). The "judgment" used herein is processing of judging whether to invalidate registration information of the transmission table 711.

When judged NO in Step S501, the transmission packet analysis section 713 ends the invalidation processing without any further operations. When judged YES in Step S501, the transmission packet analysis section 713 extracts a last hit time from one of the entries in which unjudged effective connection information is registered (Step S502). Next, the transmission packet analysis section 713 compares the last hit time with a current time and calculates a lapse time since the last hit time (Step S503).

The transmission packet analysis section 713 judges whether the obtained lapse time has become equal to or longer than the invalidation judgment time period set in the transmission setting register 74 (Step S504). When the lapse time is equal to or longer than the invalidation judgment time period (YES in Step S504), the transmission packet analysis section 713 judges that the connection information of the entry is to be invalidated (Step S505). When the lapse time is smaller than the invalidation judgment time period (NO in Step S504), the transmission packet analysis section 713 keeps the connection information of the entry effective and returns to Step S501 to repeat the same processing for a next entry including unjudged effective connection information.

By adopting such processing of invalidating the registration information of the transmission table 711, efficiency of the judgment processing of a packet to be delayed can be prevented from lowering due to an enlarged transmission table 711, and an increase in a speed can be realized.

(Operation at Time of Packet Reception)

The method of delaying a transmission ACK packet has been described heretofore. However, also when the network communication apparatus 100 operates as a side that transmits data, that is, a side that receives an ACK packet, the same method can be used to delay a reception of an ACK packet.

Figure 13:
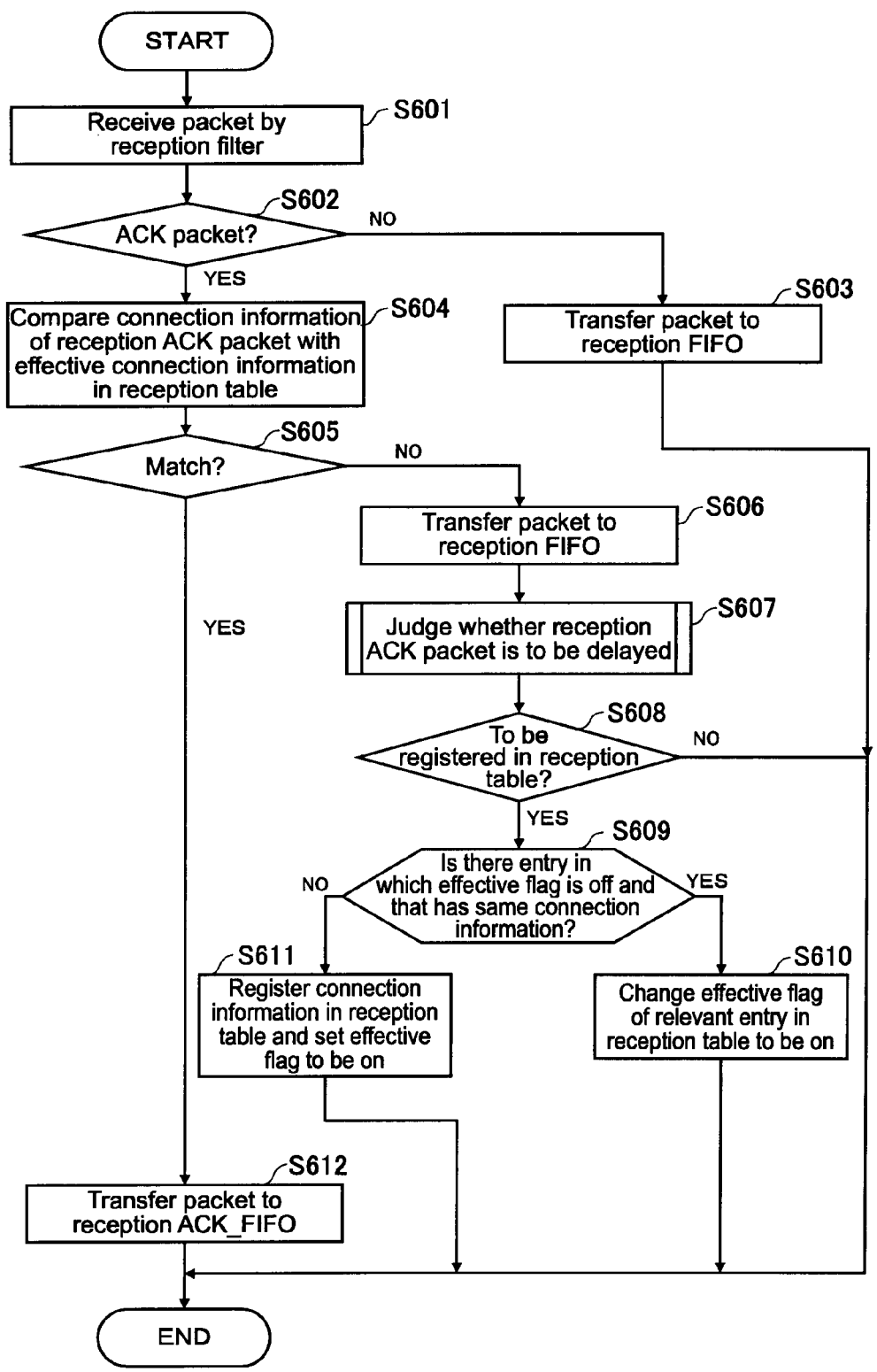
FIG. 13 is a flowchart of packet reception processing.

FIG. 13 is a flowchart of packet reception processing.

A reception packet is supplied to the reception filter 81 from the MAC section 10. When the reception packet is received by the reception filter 81 (Step S601), the reception packet analysis section 813 checks the ACK bit 634 included in a header of the reception packet (see FIG. 2) and judges whether the reception packet is an ACK packet (Step S602). When the reception packet is not an ACK packet (NO in Step S602), the reception packet analysis section 813 transfers the reception packet to the reception FIFO 30 (Step S603). The reception packet stored in the reception FIFO 30 is transferred to the higher-level layer via the system bus interface 40 when selected by the reception selector 83. The operation of the reception selector 83 will be described later in detail.

When judged in Step S602 that the reception packet is an ACK packet, the reception packet analysis section 813 compares connection information included in the header of the reception ACK packet with effective connection information registered in the reception table 811 (Step S604).

When the connection information of the reception ACK packet matches any of the effective connection information registered in the reception table 811 (YES in Step S605), the reception packet analysis section 813 transfers the reception ACK packet to the reception ACK_FIFO 82 as a reception ACK packet to be delayed (Step S612). As in the case described above, the reception ACK packet stored in the reception ACK_FIFO 82 is transferred to the higher-level layer via the system bus interface 40 when selected by the reception selector 83.

When judged in Step S605 that the connection information of the reception ACK packet does not match any of the effective connection information registered in the reception table 811 (NO in Step S605), the reception packet analysis section 813 transfers the reception ACK packet to the reception FIFO 30 (Step S606). After that, the reception packet analysis section 813 judges whether the reception ACK packet is a reception ACK packet to be delayed based on the reception filter condition set in the reception setting register 84 (Step S607). This judgment processing will be described later in detail.

When judged NO in the judgment (NO in Step S608), the reception packet analysis section 813 judges that the reception ACK packet is as packet not to be delayed and ends the processing. When judged YES (YES in Step S608), the reception packet analysis section 813 judges whether there is an entry in the reception table 811 in which the effective flag is off and connection information that is the same as the connection information included in the reception ACK packet is recorded (Step S609).

When judged YES in Step S609 (YES in Step S609), the reception packet analysis section 813 changes the effective flag of that entry from off to on for making the connection information of the entry effective (Step S610). On the other hand, when judged NO in Step S609 (NO in Step S609), the reception packet analysis section 813 newly registers the connection information of the reception ACK packet in the reception table 811 and sets the effective flag corresponding to that connection information to on (Step S611).

After that, the reception ACK packet having, in a header, the connection information that has been made effective in Step S610 or S611 is regarded as a reception ACK packet to be delayed by the comparison of Step S604 at a time the reception ACK packet is received by the reception packet analysis section 813 and transferred to the reception ACK_ FIFO 82 (Step S612).

(Information Registration Processing of Packet to be Delayed on ACK-Reception Side)

Next, information registration processing of a packet to be delayed of Step S607 will be described. It should be noted that this processing is basically the same as the information registration processing of a packet to be delayed carried out by the transmission packet analysis section 713 described above.

Figure 14:
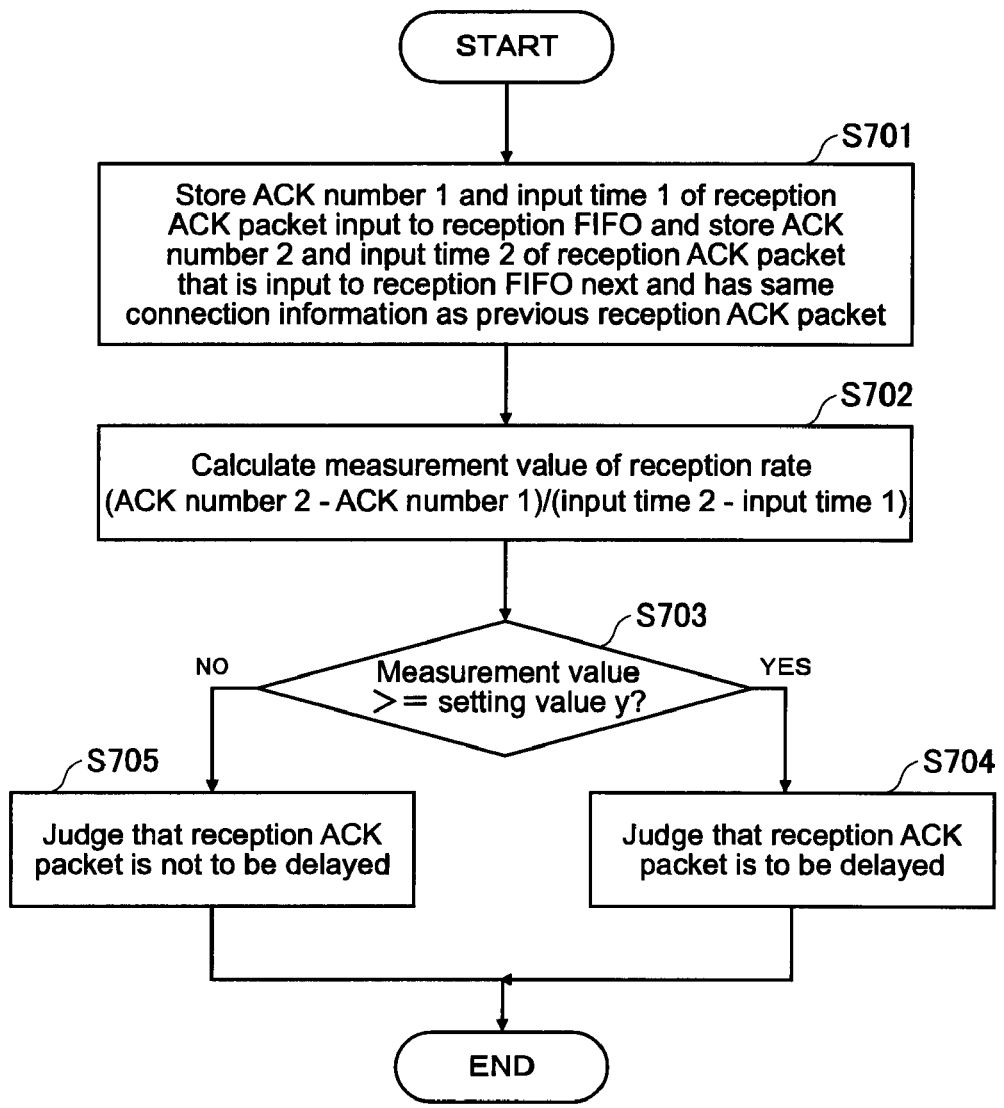
FIG. 14 is a flowchart showing an example of information registration processing of a packet to be delayed on an ACK-reception side.

FIG. 14 is a flowchart showing an example of a flow of the information registration processing of a packet to be delayed on the ACK-reception side. It should be noted that the actual judgment processing depends on the reception filter condition set to the reception setting register 84 by the user. The flowchart of FIG. 14 shows an example of the judgment processing in a case where the reception filter condition 3' is made effective and "y" is set as a setting value of a transmission rate of a reception ACK packet.

The reception packet analysis section 813 monitors reception ACK packets that are input to the reception FIFO 30 and have the same connection information in the header, and obtains a reception rate by the following operation. The reception packet analysis section 813 stores an ACK number 1 and an input time 1 of a reception ACK packet first input to the reception FIFO 30 since having started the monitoring. When a reception ACK packet that has the same connection information as the previous reception ACK packet is input to the reception FIFO 30, the reception packet analysis section 813 stores an ACK number 2 and an input time 2 of that reception ACK packet (Step S701). Then, the reception packet analysis section 813 carries out a calculation (ACK number 2−ACK number 1)/(input time 2−input time 1) and uses a value obtained as a result of the calculation as a measurement value of the reception rate of the reception ACK packet (Step S702).

Next, the reception packet analysis section 813 compares the obtained measurement value with the setting value y of the transmission rate of the reception filter condition 3' set in the reception setting register 84 (Step S703). When the measurement value of the reception rate of the reception ACK packet is equal to or larger than the setting value y as a result of the comparison (YES in Step S703), the reception packet analysis section 813 judges that the reception ACK packet is a packet to be delayed (Step S704). On the other hand, when the measurement value of the reception rate of the reception ACK packet is smaller than the setting value y (NO in Step S703), the reception packet analysis section 813 judges that the reception ACK packet is a packet not to be delayed (Step S705).

The above descriptions have been given on the information registration processing of a packet to be delayed in the case where the reception filter condition 3' is made effective. However, when the reception filter condition 1' is additionally made effective, a reception ACK packet to be a target of the process of Step S701 is narrowed down to a reception ACK packet that has, in the header, a transmission source IP address set as the reception filter condition 1'. Similarly, when the reception filter condition 2' is additionally made effective, a reception ACK packet to be a target of the process of Step S701 is narrowed down to a reception ACK packet that has, in the header, a transmission source port number and a transmission destination port number set as the reception filter condition 2'.

(Delay Processing of Reception ACK Packet)

Next, an operation of delay processing of a reception ACK packet after reception ACK packets are sorted and transferred to the reception ACK_FIFO 82 and the reception FIFO 30 in Steps S612 and S603, respectively, will be described. It should be noted that this operation is basically the same as the "delay processing of a transmission ACK packet" described above.

Timings of extracting packets from the reception ACK_FIFO 82 and the reception FIFO 30 are generated by the reception timer 85 and the reception selector 83. At this time, the timing of extracting a reception ACK packet from the reception ACK_FIFO 82 is controlled to be delayed a time period corresponding to a delay time set in the reception setting register 84 from the timing at which that reception ACK packet is input to the reception ACK_FIFO 82. This operation will be described below in detail.

Figure 15:
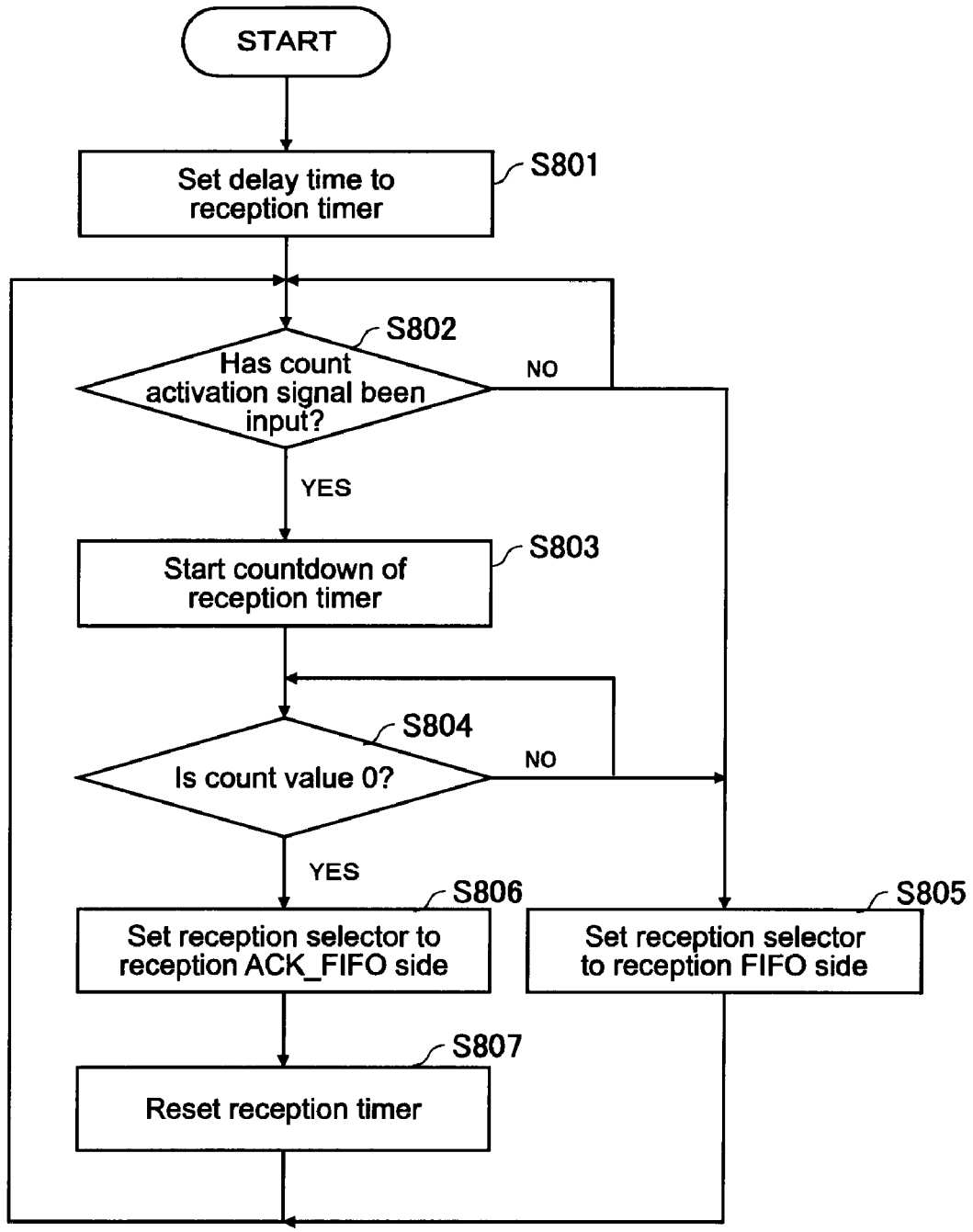
FIG. 15 is a flowchart of an operation of delay processing of a reception ACK packet.

FIG. 15 is a flowchart showing the operation of the delay processing of a reception ACK packet.

The reception timer 85 is initialized to a value of the delay time set in the reception setting register 84 (Step S801). This initialization is carried out right after the network communication apparatus 100 is activated, for example.

With an input of a count activation signal output from the reception packet analysis section 813 every time the reception packet analysis section 813 transfers one reception ACK packet to the reception ACK_FIFO 82 as a trigger (YES in Step S802), the reception timer 85 starts countdown (Step S803).

The reception timer 85 outputs a reception FIFO selection signal to the reception selector 83 before starting the countdown and right before the count value becomes "0" since having started the countdown (NO in Step S802 and NO in Step S804). While the reception FIFO selection signal is being input, the reception selector 83 selects a reception packet (data packet) of the reception FIFO 30 and transfers it to the higher-level layer via the system bus interface 40.

On the other hand, when the count value of the reception timer 85 reaches "0" (YES in Step S804), the reception timer 85 outputs a reception ACK_FIFO selection signal to the reception selector 83. The reception selector 83 selects a reception ACK packet of the reception ACK_FIFO 82 according to the input reception ACK_FIFO selection signal (Step S806) and transfers it to the higher-level layer via the system bus interface 40.

After outputting the reception ACK_FIFO selection signal to the reception selector 83, the reception timer 85 is reset to the delay time value set in the reception setting register 84 (Step S807). After that, the same control is repeated from Step S802.

By such control, it becomes possible to delay the timing of transferring the reception ACK packet satisfying a specific reception filter condition to the higher-level layer.

(Method of Restricting Communication Band of Specific Application Protocol on ACK-Reception Side)

Next, a method of restricting a communication band of a specific application protocol on the ACK-reception side will be described. Also in this case, the method is basically the same as the "method of restricting communication band of specific application protocol on ACK-transmission side" described above.

Specifically, as the "combination of transmission source port number and transmission destination port number" of the reception filter condition 2', a combination of a transmission source port number and a transmission destination port number corresponding to an application protocol whose communication band to be used is to be restricted is set in the reception setting register 84. At this time, the reception filter condition 1' and the reception filter condition 3' only need to be set as necessary. Specifically, the reception filter condition 1' only needs to be set when the communication band of the application protocol with respect to a specific ACK transmission source is to be restricted. Moreover, the setting of the reception filter condition 3' only needs to be added when a communication band of a specific application protocol is to be additionally restricted depending on a reception rate of a reception ACK packet.

Next, information registration processing of a packet to be delayed in a case where a transmission source port number and a transmission destination port number corresponding to a specific application protocol are set as the reception filter condition 2' and a setting value of a reception rate of a reception ACK packet of the reception filter condition 3' is set will be described.

Figure 16:
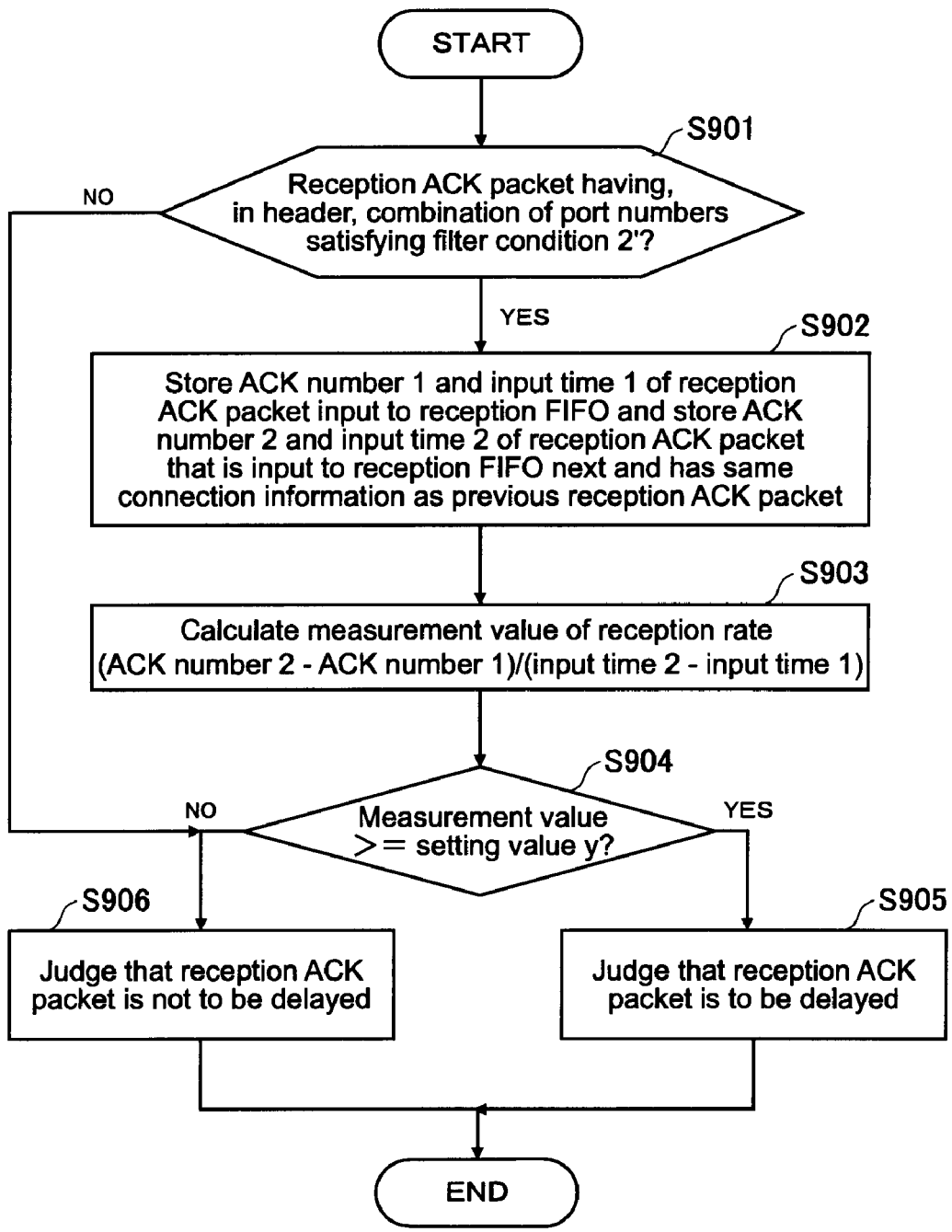
FIG. 16 is a flowchart showing another information registration processing of a packet to be delayed on the ACK-reception side.

FIG. 16 is a flowchart of the information registration processing of a packet to be delayed.

The reception packet analysis section 813 checks a combination of a transmission source port number and a transmission destination port number included in a header of a reception ACK packet transferred to the reception FIFO 30. The reception packet analysis section 813 judges whether the combination matches any of the combinations of the transmission source port number and the transmission destination port number set in the reception setting register 84 as the reception filter condition 2' (Step S901).

When the combination does not match any of the combinations (NO in Step S901), the reception packet analysis section 813 judges that the reception ACK packet is a packet not to be delayed (Step S906). On the other hand, when there is a match (YES in Step S901), the reception packet analysis section 813 monitors reception ACK packets that are input to the reception FIFO 30 and have the same connection information in the header, and obtains a reception rate by the following operation. The reception packet analysis section 813 stores an ACK number 1 and an input time 1 of a reception ACK packet first input to the reception FIFO 30 since having started the monitoring. When a reception ACK packet that has the same connection information as the previous reception ACK packet is input to the reception FIFO 30, the reception packet analysis section 813 stores an ACK number 2 and an input time 2 of that reception ACK packet (Step S902). Then, the reception packet analysis section 813 carries out a calculation (ACK number 2−ACK number 1)/(input time 2−input time 1) and uses a value obtained as a result of the calculation as a measurement value of the reception rate of the reception ACK packet (Step S903).

The operation after that is the same as that of the flowchart of FIG. 14. Specifically, the reception packet analysis section 813 compares the obtained measurement value of the reception rate with the setting value y of the transmission rate of the reception filter condition 3' (Step S904). When the measurement value of the reception rate of the reception ACK packet is equal to or larger than the setting value y (YES in Step S904), the reception packet analysis section 813 judges that the reception ACK packet is a packet to be delayed (Step S905). On the other hand, when the measurement value of the reception rate of the reception ACK packet is smaller than the setting value y (NO in Step S904), the reception packet analysis section 813 judges that the reception ACK packet is a packet not to be delayed (Step S906).

An operation of selectively extracting packets from the reception FIFO 30 and the reception ACK_FIFO 82 after that by the reception timer 85 and the reception selector 83 and transferring them to the higher-level layer via the system bus interface 40 is the same as that described above.

The processing of invalidating the registration information in the reception table 811 is carried out in the same manner as the processing of invalidating the registration information in the transmission table 711.

As described above, according to the network communication apparatus 100 of this embodiment, it becomes possible to restrict a communication band with respect to a specific communication counterpart and restrict a band of communication that uses a specific application protocol. For example, by setting a filter condition such that a communication band in best-effort communication of an FTP or the like is restricted and a communication band of a moving image streaming is not restricted, a sufficient band can be secured for a transmission of a moving image streaming even when communication by the two application protocols are held at the same time. As a result, a moving image streaming can be favorably reproduced in a reception-side reproduction apparatus.

Moreover, according to the network communication apparatus 100 of this embodiment, a communication band with respect to a specific communication counterpart and a band of communication that uses a specific application protocol can be restricted in either case where the network communication apparatus 100 operates as the ACK-transmission side (data-reception side) or where the network communication apparatus 100 operates as the ACK-reception side (data-transmission side). As a result, a band that can be allocated to communication of other specific connections can be increased to thus improve a communication quality.

Further, since the setting value of the transmission rate of the ACK packet can be set as the filter condition in the transmission setting register 74 and the reception setting register 84, the band can be restricted only when the measurement value of the transmission rate of the ACK packet becomes too large. As a result, a connection in which an acknowledgment needs to be delayed can be judged with higher reliability.

Furthermore, since the delay time of the transmission ACK packet and the delay time of the reception ACK packet can be set separately, the control can be favorably performed even in a case where a band that can be used for a transmission and a band that can be used for a reception differ.

It should be noted that the settings of the transmission setting register 74 and the reception setting register 84 are made by an application program executed by the CPU 3 connected to the system bus 2. Based on the application program, the CPU 3 displays on a monitor (not shown) an interface screen for settings for a user to see. The CPU 3 sets a filter condition input by the user by operating an input apparatus (not shown) such as a keyboard and a mouse with respect to the interface screen to the transmission setting register 74 and the reception setting register 84 via the system bus interface 40.

MODIFIED EXAMPLE 1

The above embodiment has compared the lapse time since the last hit time and the invalidation judgment time period in the processing of invalidating the registration information in the transmission table 711. However, a modified example is as follows. The transmission packet analysis section 713 manages, for each connection information in the transmission table 711, the number of comparisons having no hit with respect to connection information of a transmission ACK packet. The transmission packet analysis section 713 judges, in certain time cycles, the connection information whose number of comparisons is a preset number or less as a target to be invalidated. This method bears the same effect as the method described above. This method can be similarly used in the processing of invalidating the registration information in the reception table 811.

MODIFIED EXAMPLE 2

In the above embodiment, the filter condition for judging an ACK packet to be delayed has been set arbitrarily by the user. However, it is also possible to set an IP address of a communication counterpart, a port number, a transmission rate value, and the like as an unfilter condition for judging an ACK packet to be excluded from a delay target. Each of the transmission packet analysis section 713 and the reception packet analysis section 813 performs a judgment on an ACK packet to be delayed based on the unfilter condition. In the method of judging an ACK packet to be delayed based on the filter condition, there has been a fear that an ACK packet of an unknown communication counterpart or an unknown application protocol may be judged not to be delayed. On the other hand, in the method of judging an ACK packet to be delayed based on the unfilter condition, an ACK packet of an unknown communication counterpart or an unknown application protocol is not excluded from the delay target. Accordingly, a band of communication with a specific known communication counterpart or communication that uses a specific known port number can be stably secured, and a communication quality can be improved.

Second Embodiment

The first embodiment above has described the network communication apparatus 100 incorporated into the information processing apparatus 200 that is capable of using received data. However, the present invention is not limited to the above embodiment.

For example, the present invention is also applicable to a network relay apparatus such as a switching hub and a router. The network relay apparatus includes a plurality of ports connectable to an apparatus such as an information processing apparatus. The network relay apparatus reads a transmission destination MAC address or IP address described in a header of a packet received via a certain port and transfers the packet to other ports to which a transmission destination apparatus is connected.

Figure 17:
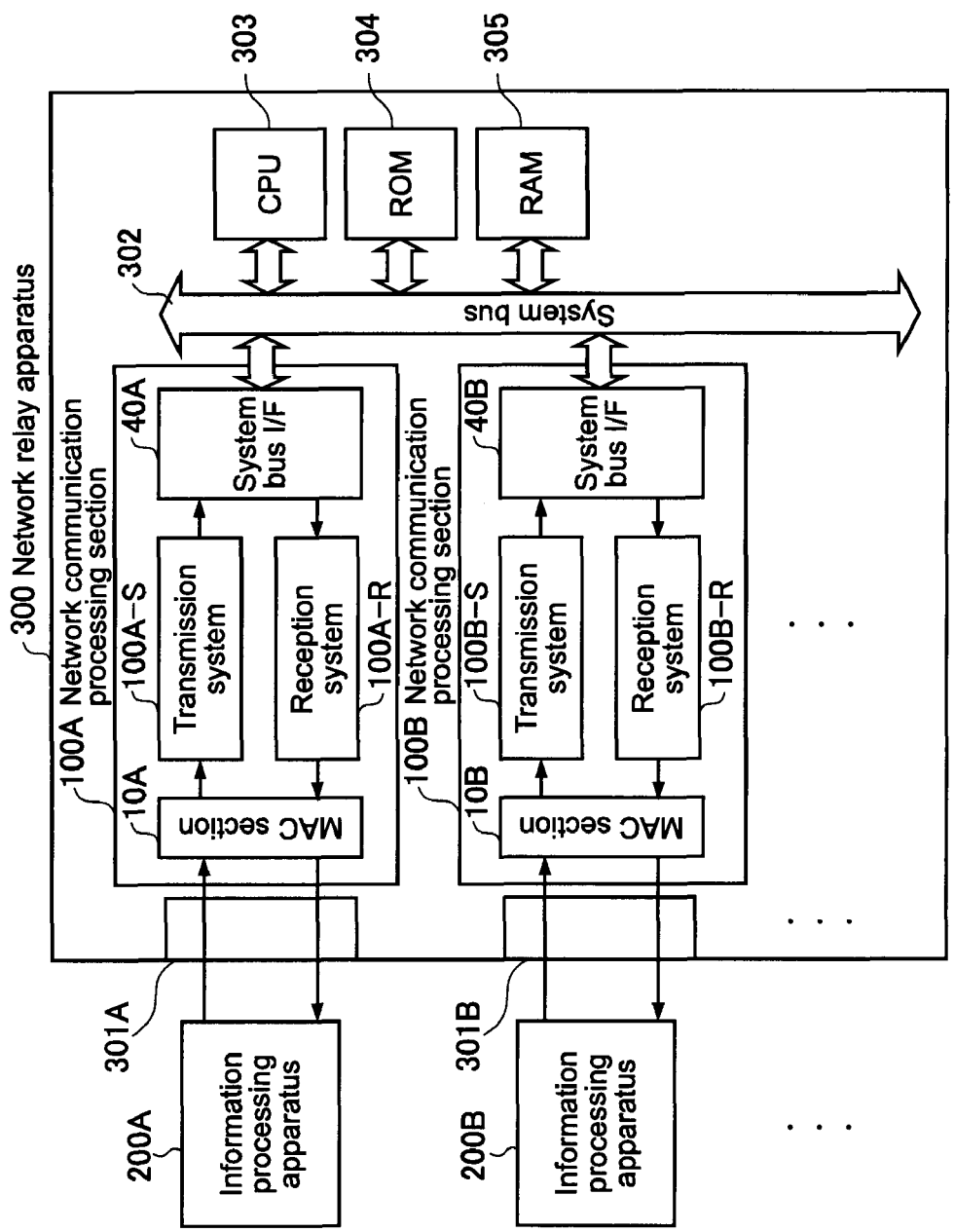
FIG. 17 is a diagram showing a structure of a network relay apparatus according to a second embodiment of the present invention.

FIG. 17 is a diagram showing a structure of a network relay apparatus according to a second embodiment of the present invention. As shown in the figure, a network relay apparatus 300 is an apparatus into which network communication processing sections 100A, 100B, ... corresponding to the network communication apparatus 100 of the first embodiment shown in FIG. 3 are incorporated in association with ports 301A, 301B, ... connectable to information processing apparatuses 200A, 200B, ... , respectively. The network relay apparatus 300 includes, in addition to the network communication processing sections 100A, 100B, ..., a system bus 302, a CPU 303, a ROM 304, a RAM 305, and the like.

Here, an operation carried out in a case where a packet is transmitted from the information processing apparatus 200A connected to the first port 301A of the network relay apparatus 300 to the information processing apparatus 200B connected to the second port 301B will be described schematically.

The information processing apparatus 200A transfers a transmission packet addressed to the information processing apparatus 200B to the network communication processing section 100A. After subjecting the transmission packet transferred from the information processing apparatus 200A to MAC layer processing in a MAC section 10A, the network communication processing section 100A carries out, in a transmission system 100A-S, the transmission processing of FIG. 7, the information registration processing of a packet to be delayed of FIG. 8, and the delay processing of a transmission ACK packet of FIG. 9. The transmission packet processed in the transmission system 100A-S is transmitted to the system bus 302 via a system bus interface 40A.

The CPU 303 inside the network relay apparatus 300 checks the transmission destination MAC address or IP address described in the header of the transmission packet transmitted to the system bus 302 by the transmission system 100A-S of the network communication processing section 100A. The CPU 303 searches for, from a correspondence table of the port number and the MAC address or IP address, that is stored in advance in the RAM 305, the second port 301B to which the information processing apparatus 200B as the transmission destination is connected. The CPU 303 transfers the transmission packet to the network communication processing section 100B corresponding to the second port 301B via the system bus 302.

The network communication processing section 100B receives the packet transferred via the system bus 302 as a reception packet. The network communication processing section 100B carries out, in a reception system 100B-R, the packet reception processing of FIG. 13, the information registration processing of a packet to be delayed of FIG. 14, and the delay processing of a reception ACK packet of FIG. 15 on the reception packet. The reception packet processed in the reception system 100B-R of the network communication processing section 100B is transferred to the information processing apparatus 200B after being subjected to MAC layer processing in a MAC section 10B.

The same operation is carried out when transmitting a packet from the information processing apparatus 200B connected to the second port 301B of the network relay apparatus 300 to the information processing apparatus 200A connected to the first port 301A.

The present application contains subject matter related to that disclosed in Japanese Priority Patent Application JP 2009-071890 filed in the Japan Patent Office on Mar. 24, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A network communication apparatus transmitting, via a network, a first acknowledgment transferred from a higher-level layer with respect to a reception of a predetermined number of first segments to a transmission source of the first segments, and transmitting, via the network, a second segment transferred from the higher-level layer with respect to a reception of a second acknowledgment to a transmission source of the second acknowledgment, the network communication apparatus comprising:

a first condition setting section in which a first condition for specifying a connection in which to delay the first acknowledgment is set;

a first judgment means for judging whether the first acknowledgment transferred from the higher-level layer is to be delayed in accordance with the first condition set in the first condition setting section;

a transmission processing means for delaying the first acknowledgment judged to be delayed and transmitting the first acknowledgment to the transmission source of the first segments, wherein the transmission processing means includes:

a first table registration means for extracting first connection information that specifies a connection from a header of the first acknowledgment judged to be delayed by the first judgment means, and for registering the first connection information in a first table, a first delay means for comparing second connection information, the second connection information being included in a header of the first acknowledgment transferred from the higher-level layer with the first connection information in the first table, and for delaying the first acknowledgment when the second connection information and the first connection information match;

a second condition setting section in which a second condition for specifying a connection in which to delay the second acknowledgment is set;

a second judgment means for judging whether the second acknowledgment received via the network is to be delayed in accordance with the second condition set in the second condition setting section;

a reception processing means for delaying the second acknowledgment judged to be delayed and transferring the second acknowledgement to the higher-level layer; and a first invalidation information setting means for calculating a continuous time during which the first connection information does not match the second connection information in the comparison for each of the first connection information registered in the first table, and setting information for invalidating, as a comparison target of the second connection information, the first connection information whose continuous time has exceeded a preset time in the first table in association with the first connection information.

2. The network communication apparatus according to claim 1, wherein the first condition and the second condition each comprise a port number and an IP address of a communication counterpart, wherein the first judgment means judges that the first acknowledgment is to be delayed when a port number and an IP address of a communication counterpart included in a header of the first acknowledgment transferred from the higher-level layer match, respectively, a port number and an IP address of a communication counterpart associated with the first condition, and wherein the second judgment means judges that the second acknowledgment is to be delayed when a port number and an IP address of a communication counterpart included in a header of the second acknowledgment received via the network match a port number and an IP address, respectively, of a communication counterpart associated with the second condition.

3. The network communication apparatus according to claim 2,
wherein the first condition further comprises an upper limit of a first transmission rate of the first acknowledgment,
wherein the first judgment means judges that the first acknowledgment is to be delayed, when the port number and the IP address of a communication counterpart included in the header of the first acknowledgment transferred from the higher-level layer match, respectively, the port number and the IP address of a communication counterpart associated with the first condition, and when a measurement value of a transmission rate of the first acknowledgment is equal to or larger than the upper limit of the first transmission rate of the first condition,
wherein the second condition further comprises an upper limit of a second transmission rate of the second acknowledgment, and
wherein the second judgment means judges that the second acknowledgment is to be delayed, when the port number and the IP address of a communication counterpart included in the header of the second acknowledgment received via the network match, respectively, the port number and the IP address of a communication counterpart associated with the second condition, and when a measurement value of a transmission rate of the second acknowledgment is equal to or larger than the upper limit of the second transmission rate included in the second condition.

4. The network communication apparatus according to claim 1, wherein the transmission processing means includes:
a second table registration means for extracting third connection information that specifies a connection from the header of the second acknowledgment judged to be delayed by the second judgment means, and for registering it in a second table, and
a second delay means for comparing fourth connection information included in the header of the second acknowledgment received via the network with the third connection information in the second table, and for delaying the second acknowledgment when the fourth connection information and the third connection information match,
the network communication apparatus further comprising:
a second invalidation information setting means for calculating a continuous time during which the third connection information does not match the fourth connection information in the comparison for each of the third connection information registered in the second table, and setting information for invalidating, as a comparison target of the fourth connection information, the third connection information whose continuous time has exceeded a preset time in the second table in association with the third connection information.

5. The network communication apparatus according to claim 4,
wherein the first delay means includes:
a first acknowledgment packet storage section capable of storing, by a first-in first-out method, a plurality of packets of the first acknowledgment judged to be delayed by the first judgment means,
a first packet storage section capable of storing, by the first-in first-out method, a plurality of packets other than that of the first acknowledgment to be delayed,
a first selection means for selectively extracting a packet from the first acknowledgment packet storage section and the first packet storage section, and
a first timer means for starting timing with an input of the first acknowledgment to the first acknowledgment packet storage section as a trigger, causing the first selection means to select the packet of the first acknowledgment from the first acknowledgment packet storage section at a time a preset first time period passes, and causing the first selection means to select a packet other than that of the first acknowledgment from the first packet storage section at other times, and
wherein the second delay means includes:
a second acknowledgment packet storage section capable of storing, by the first-in first-out method, a plurality of packets of the second acknowledgment judged to be delayed by the second judgment means,
a second packet storage section capable of storing, by the first-in first-out method, a plurality of packets other than that of the second acknowledgment to be delayed,
a second selection means for selectively extracting a packet from the second acknowledgment packet storage section and the second packet storage section, and
a second timer means for starting timing with an input of the second acknowledgment to the second acknowledgment packet storage section as a trigger, causing the second selection means to select the packet of the second acknowledgment from the second acknowledgment packet storage section at a time a preset second time period passes, and causing the second selection means to select a packet other than that of the second acknowledgment from the second packet storage section at other times.

6. A network communication apparatus transmitting, via a network, a first acknowledgment transferred from a higher-level layer with respect to a reception of a predetermined number of first segments to a transmission source of the first segments, the network communication apparatus comprising:
a first condition setting section in which a first condition for specifying a connection in which to delay the first acknowledgment is set;
a first judgment means for judging whether the first acknowledgment transferred from the higher-level layer is to be delayed in accordance with the first condition set in the first condition setting section;
a transmission processing means for delaying the first acknowledgment judged to be delayed, and transmitting the first acknowledgement to the transmission source of the first segments, wherein the transmission processing means includes:
a first table registration means for extracting first connection information that specifies a connection from a header of the first acknowledgment judged to be delayed by the first judgment means, and for registering the first connection information in a first table,
a first delay means for comparing second connection information, the second connection information being included in a header of the first acknowledgment transferred from the higher-level layer with the first connection information in the first table, and for delaying the first acknowledgment when the second connection information and the first connection information match; and a first invalidation information setting means for calculating a continuous time during which the first connection information does not match the second connection information in the comparison for each of the first connection information registered in the first table, and setting information for invalidating, as a comparison target of the second connection information, the first connection information whose continuous time has exceeded a preset time in the first table in association with the first connection information.

7. A network communication apparatus transmitting, via a network, a second segment transferred from a higher-level layer with respect to a reception of a second acknowledgment to a transmission source of the second acknowledgment, the network communication apparatus comprising:

a second condition setting section in which a second condition for specifying a connection in which to delay the second acknowledgment is set;

a second judgment means for judging whether the second acknowledgment received via the network is to be delayed in accordance with the second condition set in the second condition setting section;

a reception processing means for delaying the second acknowledgment judged to be delayed and transferring the second acknowledge to the higher-level layer, wherein the reception processing means includes:

a second table registration means for extracting third connection information that specifies a connection from a header of the second acknowledgment judged to be delayed by the second judgment means, and for registering it in a second table, and a second delay means for comparing fourth connection information included in a header of the second acknowledgment received via the network with the third connection information in the second table, and for delaying the second acknowledgment when the fourth connection information and the third connection information match; and a second invalidation information setting means for calculating a continuous time during which the third connection information does not match the fourth connection information in the comparison for each of the third connection information registered in the second table, and setting information for invalidating, as a comparison target of the fourth connection information, the third connection information whose continuous time has exceeded a preset time in the second table in association with the third connection information.

* * * * *